United States Patent [19]

Goodman

[11] Patent Number: 5,182,014

[45] Date of Patent: Jan. 26, 1993

[54] METHOD AND APPARATUS FOR INCREASING FLOTATION CELL RECOVERY AND GRADE OF COMPLEX COPPER-CONTAINING ORES

[76] Inventor: Laurence R. Goodman, 299 Bear Dr., Golden Gate Park Estates, Golden, Colo. 80403

[21] Appl. No.: 530,970

[22] Filed: May 30, 1990

[51] Int. Cl.$^5$ .......................... B03D 1/02; B03D 1/06; B03D 1/16; B03D 1/24

[52] U.S. Cl. .................... 209/164; 209/166; 209/167; 209/168; 209/169; 209/170; 241/20; 241/21; 241/24; 204/275; 204/277

[58] Field of Search .............. 209/164, 168, 169, 170, 209/166, 167, 901; 204/275, 277; 241/20, 21, 24

[56] References Cited

U.S. PATENT DOCUMENTS

| | | |
|---|---|---|
| 1,022,085 | 3/1912 | Hyde . |
| 1,069,169 | 8/1913 | Parker .................. 209/168 |
| 1,344,127 | 6/1920 | Greenwalt ............. 209/164 |
| 1,421,583 | 7/1922 | Sheridan et al. . |
| 1,469,042 | 9/1923 | Hellstrand . |
| 2,038,400 | 4/1936 | Whitworth ............ 209/166 |
| 2,258,507 | 10/1941 | Hoag ..................... 209/169 |
| 3,479,281 | 11/1969 | Kikindai ................ 209/170 |
| 3,552,571 | 1/1971 | Neusplel ................ 210/221 |
| 3,726,780 | 4/1973 | Harnden ................ 204/275 |
| 3,853,736 | 12/1974 | Harden .................. 204/269 |
| 3,888,751 | 6/1975 | Minegishi .............. 204/152 |
| 3,898,150 | 8/1975 | Russell .................. 204/275 |
| 3,944,478 | 3/1976 | Kuji ...................... 204/275 |
| 3,959,131 | 5/1976 | Ramirez ................. 209/170 |
| 3,970,536 | 7/1976 | Shettel .................. 204/180 |
| 3,975,269 | 8/1976 | Ramirez ................. 210/44 |
| 3,989,608 | 11/1976 | DeMonbrun ........... 204/149 |
| 4,031,006 | 6/1977 | Ramirez ................. 209/170 |
| 4,101,409 | 7/1978 | Austin ................... 204/277 |
| 4,120,765 | 10/1978 | King ...................... 204/149 |
| 4,202,767 | 5/1980 | Alfenaar ................ 210/44 |
| 4,224,148 | 9/1980 | Lindman ................ 210/714 |
| 4,623,436 | 11/1986 | Umchara ................ 204/149 |
| 4,737,272 | 4/1988 | Szatkowski ............ 209/170 |

FOREIGN PATENT DOCUMENTS

| | | | |
|---|---|---|---|
| 77005 | 7/1976 | Australia ................. 210/221 |
| 194757 | 8/1988 | Japan ..................... 209/168 |
| 598647 | 3/1978 | U.S.S.R. ................ 209/169 |
| 900866 | 2/1982 | U.S.S.R. ................ 209/169 |
| 984497 | 1/1983 | U.S.S.R. ................ 209/170 |
| 1002025 | 3/1983 | U.S.S.R. ................ 209/170 |
| 1003906 | 3/1983 | U.S.S.R. ................ 209/169 |
| 1003907 | 3/1983 | U.S.S.R. ................ 209/169 |
| 1297919 | 3/1987 | U.S.S.R. ................ 209/170 |

OTHER PUBLICATIONS

The Early Days of Froth Flotation–Hines, P. R. and Vincent, J. D. Froth Flotation 50th Anniversary Volume Society of Mining Engineers, D. W. Fuestenan, Editor.

Historical Outline of Major Flotation Developments, Crabtree and Vincent, Froth Flotation, 50th Anniversary Volume, Society of Mining Engineers, D. W. Fuestenan, Editor.

Selective Separation of Fine Mineral Slimes Using the Method of Electric Flotation, Electrochemistry in Industrial Processing and Biology..

Primary Examiner—Stanley S. Silverman
Assistant Examiner—Thomas M. Lithgow
Attorney, Agent, or Firm—Dorr, Carson, Sloan & Peterson

[57] ABSTRACT

Micron sized gas bubbles produced by electrolysis (e.g., oxygen and/or hydrogen gas bubbles by the electrolysis of water) are introduced into a flotation cell which is also provided with larger bubbles produced by sparging a gas such as air into the flotation cell. The mixed presence of both large bubbles and small bubbles serves to improve the recovery of various copper-containing ores. The small bubble producing electrodes can be retrofitted into an existing sparged gas driven flotation cell.

13 Claims, 14 Drawing Sheets

ELECTRO COLUMN SCHEMATIC

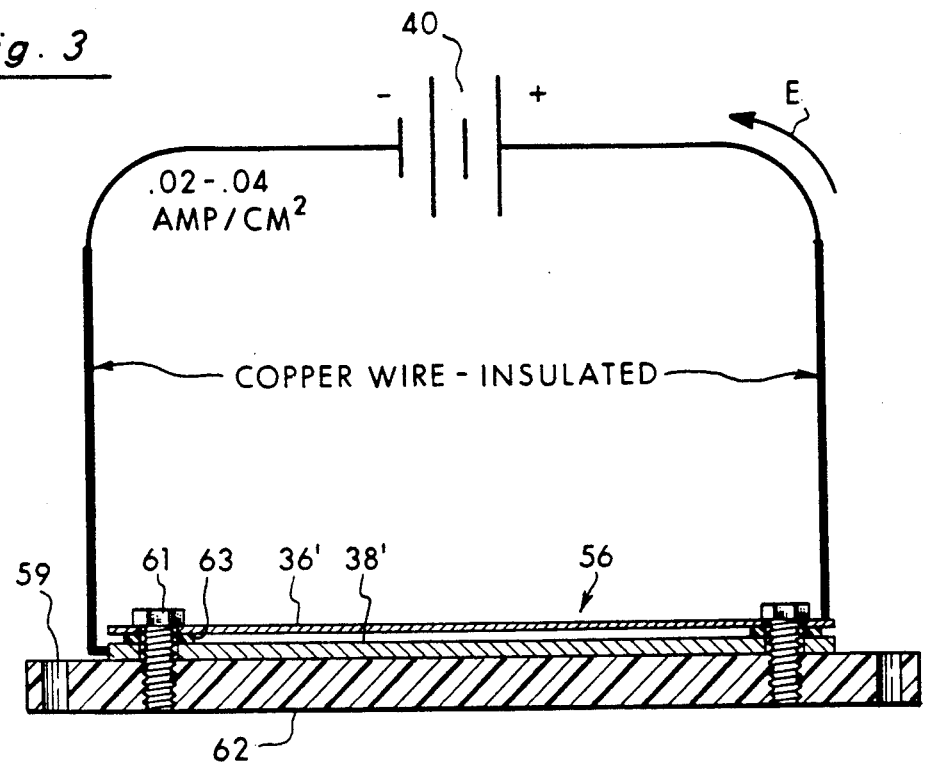
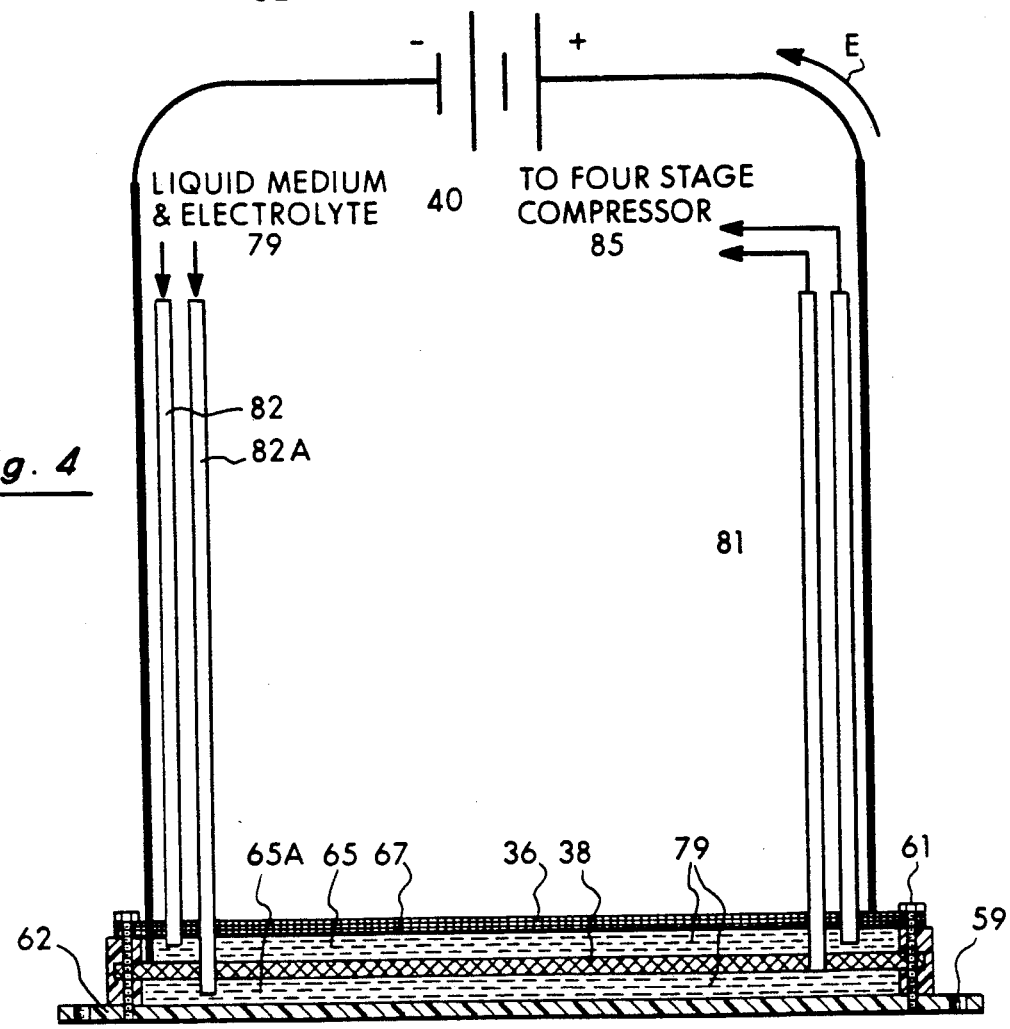

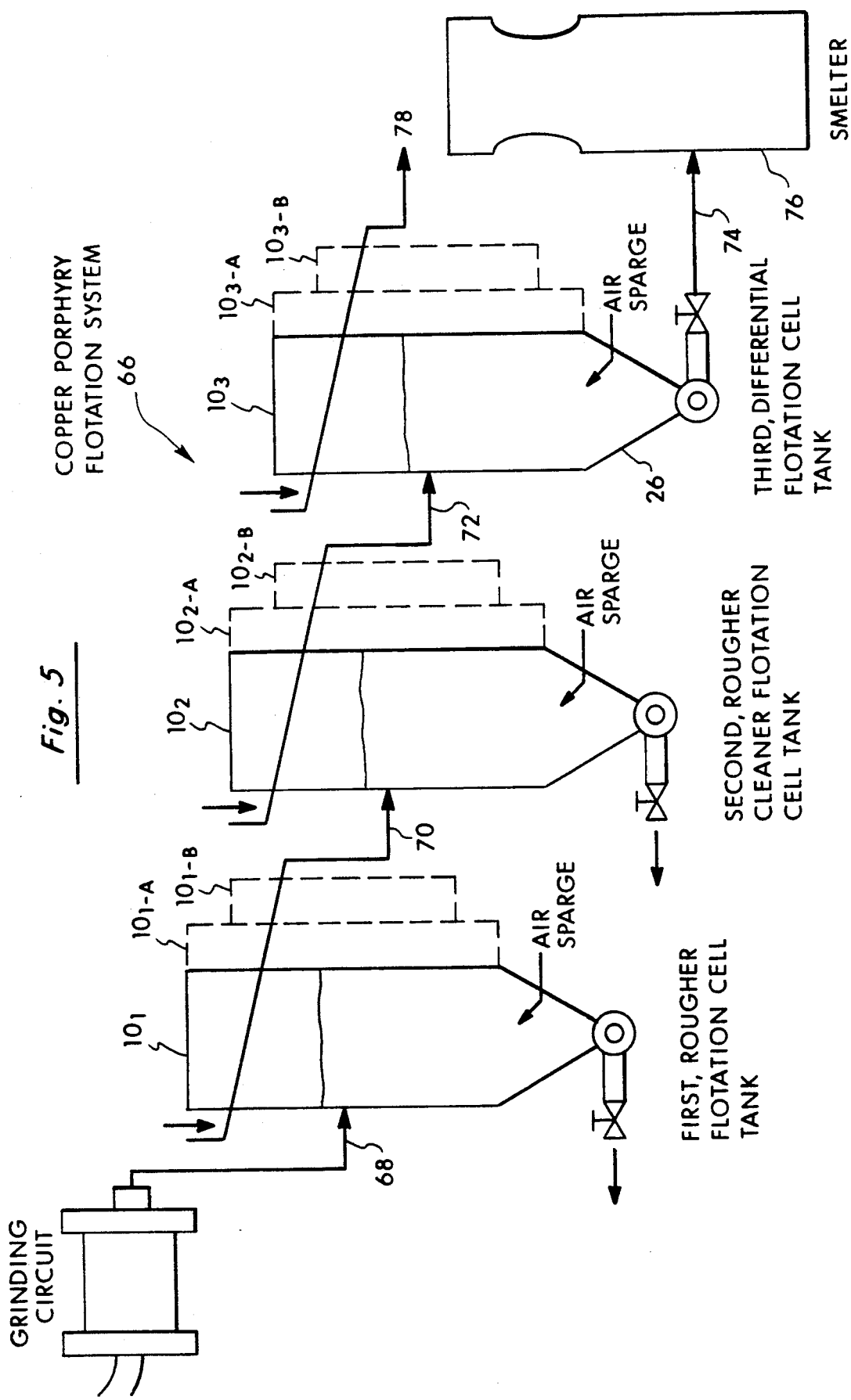

SIMPLIFIED COPPER MAGMATIC FLOWSHEET

SIMPLIFIED ZINC-LEAD FLOWSHEET

SIMPLIFIED COPPER-LEAD-ZINC FLOWSHEET

ELECTROFLOTATION DEVICE MOUNTED DIAGONALLY

ELECTROFLOTATION APPARATUS
RETROFITTED FOR LARGE FLOTATION
CELL

COMPARISON OF GRADE CONVENTIONAL FLOTATION VS. ELECTROFLOTATION

COMPARISON OF RECOVERY BY SIZE FRACTION CONVENTIONAL FLOTATION VS. ELECTROFLOTATION

METHOD AND APPARATUS FOR INCREASING FLOTATION CELL RECOVERY AND GRADE OF COMPLEX COPPER-CONTAINING ORES

BACKGROUND OF THE INVENTION

1. Field of the Invention

This invention relates to methods and/or apparatus for purification of, or separation of, metal ore constituents from complex copper containing ores by use of sparged-gas flotation cells in various kinds of flotation processes.

2. Description of the Prior Art Re: Complex Copper-Containing Ores

Those skilled in this art will appreciate that no two ore deposits are alike and that processes for extracting economic minerals from deposits can be as different as the ore deposits because they vary in make-up of major and minor economic minerals, degree of dissemination, means of formation, degree of oxidation, grain size of minerals, mineral associations, quantities of minerals, porosity, permeability, and composition of gangue minerals.

Similarly, the processing of ore bodies also may vary with the treatment equipment used, the design of grinding circuit(s) and/or the reagents used to extract or separate various minerals. For example, several processes have been used to produce a rising flow of gas bubbles for froth flotation of certain minerals and/or metal constituents of a wide variety of ores. Moreover, within this overall process, the number of flotation tanks, size and type of such tanks, as well as the stages of separation, the reagents employed and the flow schemes are usually unique to a given type of ore deposit.

Separation of minerals by flotation may be divided into three major processes: (1) bulk flotation—the flotation of all economic minerals into a concentrate with the depression of gangue minerals and especially the case wherein the concentrate is floated in several stages to continuously remove the gangue before final treatment by leaching or smelting; (2) reverse or back flotation—the flotation of gangue minerals while the economic minerals are depressed and (3) differential flotation—the flotation of economic minerals while gangue minerals are depressed, and the case where a continued treatment results in the economic minerals being selectively separated by flotation of one or more economic minerals while depressing one or more other economic minerals. Moreover, in all of these flotation processes, and especially in the differential flotation processes, several stages of flotation are usually employed to obtain a final product. Differential flotation has been used successfully on several major complex ore types including copper porphyry, copper magmatic, lead-zinc ores, and copper lead-zinc ores. However, the object of differential flotation in the treatment of complex ores of the aforementioned types remains the economic advantage resulting from a separation of various major valuable economic minerals in such ores.

In copper porphyry ores, the major copper bearing economic minerals include chalcopyrite, covelite, chalcocite, bornite, enargite, digenite, native copper, cuperite, azurite, and malachite. Those skilled in this art will also appreciate that molybdenite is a major economic non-copper bearing mineral in copper porphyry ores. Moreover, those minor non-copper bearing economic minerals sometimes associated with a given copper porphyry ores may include electrum, tentrahedrite-tennantite, argentite, sphalerite, and galena (gold, silver, zinc, and lead bearing minerals). It should also be noted that pyrite and other iron sulfide bearing minerals in copper porphyry deposits usually are considered gangue materials. Those skilled in this art will also appreciate that "simple" copper ores (comprised of just one ore component and gangue, (e.g., one percent chalcopyrite or native copper and 99% gangue) can be treated in the same way as "complex" ores (those having several economic mineral components) can be treated by the process of this invention and that the terms "simple" and "complex" should be regarded as equivalent in the context of this particular invention.

In one widely practiced flotation process (see generally FIG. 7), copper porphyry ores are concentrated by a process which begins with the introduction of a slurry of such ores (in a ground and or milled state) into a first stage (often referred to as a "rougher flotation"), sparged-air-driven, froth flotation tank or system of such first stage tanks in order to produce a low grade copper-molybdenite concentrate. The concentrate from the first stage is then upgraded in a second stage (often referred to as a "rougher cleaner flotation"), sparged-air-driven, flotation tank or system of such second stage flotation tanks. It should also be noted that collector reagents may be added at different stages during the process; e.g., in the grinding mill producing the ore pulp just prior to its introduction into the flotation cells and in the flotation cells (as well as in multiple places in the overall process) to produce the desired results. For example, in the first and second stages of flotation, pyrite and other gangue minerals are typically "depressed" by the use of depressant agents such as cyanide and/or lime.

The concentrate from the second stage is then collected and transported to a third stage (differential flotation") tank or series of such tanks which also employ air-sparging in order to separate the copper constituents and other minor economic minerals from the molybdenite. In such a third stage, differential flotation, cell system, copper minerals are typically "depressed" through the use of sodium hydrosulfide, sodium sulfide, or ammonium sulfide. Moreover, burner oil is often used to "float" the molybdenite component of the ore. Other broad considerations regarding these reagents also may apply. By way of example, the collector reagents used during flotation processes are often controlled by the electrical nature of a given mineral's surface since the surface potential of every mineral is, to a large extent, unique. Thus, the ions that are chemiabsorbed on the surface of a given mineral establish a surface charge and are called potential-determining ions. Such potential determining ions may be composed of hydrogen or hydroxyl ions, collector ions, or ions that form complex ions with the ions on the mineral surface. Those skilled in this art also will appreciate that the activity of the potential determining ions at which the surface charge is zero, is called the point of zero charge (PZC). Chalcopyrite for example is known to have a PZC of from 2.0 to 3.0, while pyrite has a PZC of 6.2 to 6.9 and scheelite has a PZC of 10.2. The PZC is a major factor in determining the collector that must be added to the flotation circuit to be absorbed on the mineral which results in flotation. Thus, fatty acids are often employed as collector reagents for scheelite, but they generally will not work for pyrite and xanthate.

Similarly, collector reagents used for pyrite will not work for scheelite and so forth.

Be that as it may, the tailings taken from the bottom of the differential flotation cell(s) of the third stage, which generally contain the majority of the copper bearing mineral component of the ore, are then usually pumped to a thickener. The resulting thickened product containing the copper concentrate produced by the overall flotation process, is thereafter sent (very often by slurrying and pumping transport pipes) to a smelter. This final copper concentrate also very often contains minor but still economically significant amounts of gold, silver, lead, and/or zinc minerals.

In copper magmatic deposits, the major copper bearing economic minerals typically include chalcopyrite, covelite, chalcocite, bornite, enargite, digenite, as well as native copper. Other major non-copper bearing economic minerals included in such ores might comprise: millerite, nickel bearing pyrrhotite, nickeline, pendlandite, cobaltite, glaucodot, and skutterudite (nickel and cobalt bearing minerals). Minor non-copper bearing economic minerals sometimes associated with copper magmatic deposits also may include electrum, tentrahedrite-tennantite, argentite, (gold, silver, bearing minerals). Zvyagintsevite, geversite, platinum tellurides, native platinum and palladium group minerals also are often found in varying economic quantities in copper magmatic deposits. Similarly, pyrite and other iron sulfide bearing minerals in copper magmatic deposits may or may not have economic minerals substituted into their crystal lattices.

Differential flotation processes (see generally FIGS. 8 and 9) are often applied to copper magmatic ores by a process which begins with the introduction of a slurry of such ores (in a ground and or milled state) into a first stage, sparged-air-driven, froth flotation tank or system of such tanks in order to produce a low grade copper-nickel concentrate or a copper-cobalt concentrate. The concentrate from the first stage is then upgraded in a second stage which also employs sparged-air-driven flotation tank or system of such flotation tanks. As in the case of the copper porphory ores, the collector reagents used in recovering copper magmatic ores may be introduced at different stages during the overall process, e.g., in the grinding mill, to the ore pulp just prior to its introduction into the flotation cells, to the flotation cells or at multiple points in the overall process. In the first and second stag flotations, pyrite and other gangue minerals are typically "depressed" by through the use of cyanide and/or lime. The concentrate from the second stage is then collected and transported to a differential flotation tank or series of such tanks which constitute a third stage of the overall process. These differential flotation tanks also employ air sparging in order to separate copper constituents and other minor economic minerals from cobalt or nickel constituents. In such a third stage, differential flotation cell system, copper minerals are typically separated from cobalt or nickel minerals through the simultaneous use of selective collector reagents and selective depression agents such as sodium cyanide.

The tailings taken from the bottom of such a differential flotation cell, which generally contain the majority of the cobalt or nickel bearing mineral component to the ore, are then conditioned with sulfuric acid, copper sulfate, and isopropyl xanthate in order to further "clean" these components. A resulting thickened product, containing the cobalt or nickel concentrate produced by the overall flotation process, is then sent (very often by slurry and pumping transport pipes) to a smelter. The final copper concentrate is also transported to a smelter. Here again, the greater part of minor economic platinum palladium, gold and silver minerals also reside in the copper concentrate.

In lead-zinc and lead-zinc-copper deposits, major economic minerals include galena, cerussite, anglesite, plumbojarosite, sphalerite, marmatite, (lead and zinc bearing minerals). Minor economic minerals sometimes include tentrahedrite-tennantite, argentite, sulphosalts of silver, ruby silver (silver bearing minerals), free gold, bismuth, and cadimum. The distinction between lead-zinc deposits and lead-zinc copper deposits is the economic quantities of copper bearing materials including chalcopyrite, covelite, chalcocite, bornite, enargite, digenite. Again, as in the case of the other ores, any pyrites and other iron sulfide minerals found in lead zinc ores are usually considered as gangue materials. However, they too may sometimes contain economic minerals substituted in the mineral's crystal lattice.

A similar process is commonly used for lead-zinc ore deposits and lead-zinc copper deposits (see generally FIGS. 10 and 11). Lead and zinc are separated by differential flotation. Obviously, the presence of high amounts of copper minerals would justify, from an economic standpoint, the production of a separate copper, lead, zinc concentrate. Such a process also begins with the introduction of a slurry of such ores (in a ground and or milled state) into a first stage, sparged-air-driven, differential froth flotation tank or system of such tanks in order to produce a low grade lead concentrate. Here again, collector reagents may be added at different stages during the process, e.g., in the grinding mill, to the ore pulp just prior to its introduction into the flotation cells, to the flotation cells or in several such places in the overall flow circuit. In the first stage of flotation, sphalerite pyrite and other gangue minerals are typically "depressed" through the use of cyanide and/or lime. Zinc depression is accomplished by the use of sodium sulfite or bi-sulfite in combination with zinc sulfate. The concentrate from the first stage is then collected and transported to a flotation tank or series of tanks, which also employ air sparging in order to separate and continue cleaning the lead concentrate. The tailings taken from the bottom of the differential flotation cell, which generally contain the majority of the zinc bearing mineral component to the ore, are then pumped to another series of sparged-air-driven tank or system of tanks. Several stages of cleaning may be required to produce the final zinc product. Copper sulfate is often added to activate the zinc minerals. The resulting thickened product containing the zinc concentrate produced by the overall flotation process is then sent (very often by slurry and pumping transport pipes) to a smelter. This final lead concentrate also very often contains minor economic gold, silver, and copper minerals. A copper-lead separation, when economically feasible, can be accomplished by another stage of differential flotation by depressing the lead and floating the copper or vice versa generally according to the flow scheme depicted in FIG. 12.

Thus it could be said that the correlative components of processing complex copper porphyry ores, copper magmatic ores, lead-zinc and copper-lead-zinc ores are based upon the following considerations. First of all, such ores of this type can be considered as complex ores whose major economic minerals are base metals including copper, lead, zinc, nickel, cobalt, and molybdenum. Such ores typically will require some degree of differential flotation as a means of processing and selective separation of one major economic mineral from another. Furthermore, most of these processes use multiple stages of sparged-air flotation tanks or series of such tanks. The differential flotation stage may be carried out at the beginning of the circuit, in the middle of the circuit or at the end of the circuit. Selective reagents (collectors activators, depressants and pH control agents) must be used to separate major economic minerals. Such collector reagents may be added at the different stages during the process. That is to say, they may be added at grinding mill, to the ore pulp just prior to its introduction into the flotation cells, to the flotation cells or at multiple places in the flow circuit. Moreover, regrinds of the ore may be carried out at several places in any given circuit. One or more stages of cleaning also are usually required of a major economic mineral in order to produce a final concentrate. It is also to be understood that all major ores may include minor economic minerals which usually include gold, silver, platinum or palladium group metals in varying amounts. And finally, those skilled in this art will also appreciate that selective actions against flotation of iron sulfides, including: pyrite, marcasite, arsenopyrite, pyrrhotite, magnetite and hematite may be necessary in processing many such ores.

On balance, the literature which serves to define this art will include the following references:

U.S. Pat. No. 1,022,085 teaches the use of a rougher cleaner circuit by the cleaning of rougher froth with cleaner cells with the cleaner tails returned to the rougher cells.

U.S. Pat. No. 1,020,353 teaches the use of sodium dichromate as a depressant for galena during differential flotation of complex ores.

U.S. Pat. No. 1,421,585 teaches a method for the treatment of complex ores by differential flotation through the use of cyanide and alkaline salts, such as sodium carbonate or sodium bicarbonate to depress shpalerite and pyrite during differential flotation of complex ores.

U.S. Pat. No. 1,469,042 teaches a process of differential flotation of complex ores to produce: (1) a lead mineral product free from zinc minerals; (2) a zinc mineral product free from lead, iron, and copper minerals; (3) a separation of copper minerals, iron minerals, precious metals with the lead mineral product rather than the zinc minerals; (4) a separation of the silver and gold minerals with the copper-iron-lead minerals product rather than the zinc mineral product; and (5) tailings product which no longer contains any valuable minerals. The process uses sodium sulfide, sodium monosulfide, or polysulfides of sodium to inhibit or depress zinc minerals while the other minerals are differentially removed.

U.S. Pat. No. 2,038,400 teaches the use of dithiophosphates as a flotation collector for copper which provides selectivity against pyrite.

3. Description Of Prior Art Re: Flotation Processes And Devices

It has long been appreciated that sparged air-driven, froth flotation is very effective for recovering ore particles having sizes between 300 and 20 um, but flotation efficiency commonly drops off as the particle size decreases below 20 um. This follows from the fact that whether or not a particle collides with a given bubble depends to a large degree on particle size and mass, bubble diameter, the balance of viscous, inertial, and gravitational forces acting on the particle and the form of the streamlines around the bubble.

Hence, one inability and/or inefficiency of sparged-air-driven tanks is its relative inability to separate gangue material from the economic minerals. That is to say that unwanted particles of gangue material becomes trapped (entrainment) between the immense volumes of large sparged-gas bubbles and are carried into the froth. Another inefficiency occurs during differential flotation stage when two major economic groups of minerals are sought to be separated using sparged-air-driven tanks. Here a greater portion of one major economic mineral or group of minerals is sought to be floated while the other major economic mineral or group of minerals is sought to be depressed. However, in sparged air-driven cells, particles of the economic minerals that are intended to be depressed are often trapped between the immense volumes of large sparged-gas bubbles and are carried into the froth.

For the most part, differential flotation processes have dealt with such inabilities and/or inefficiencies of sparged-air-driven flotation cells by "repeating" the same flotation in some of, or all of, the three general flotation stages previously discussed. That is to say that the relatively poor chances of a large bubble capturing a small particle have been dealt with by passing the ore pulp through successive flotation cells which comprise the first cell, the second and the third cell, i.e., the same basic sparged-air-driven froth flotation process is repeated over and over.

Similarly, the cleaning of gangue material from the froth concentrate is dealt with by passing froth concentrated recovery products through successive stages of cleaning. Each stage of cleaning can consist of a tank or a series of tanks through which the concentrate is passed. Each successive stage of cleaning removes a portion of the gangue material. In other words, the froth product is cleaned over and over until a desired grade is obtained.

Separation of economic minerals during the differential flotation stage is dealt with in a similar fashion, i.e., by passing the pulp through a series of sparged-air-driven tanks until a greater portion of one economic mineral is removed from a second economic mineral in order to deal with the problem of entrained particles from the second mineral remaining in the concentrate of the first. Thus, for example, the processing of copper porphyry ores by such prior art, sparged gas driven processes typically involve the use of: (1) a series of cells (rougher) which constitute a rougher, copper-molybdenite bearing froth; (2) a series of second cells (cleaners) for the purpose of cleaning the rough concentrated copper-molybdenite froth; (3) a series of third cells (differential flotation) to separate the copper and molybdenite; (4) a series of fourth cells (cleaners) to further "clean" the molybdenite. The processing of copper magmatic ores can use the same system as the copper porphyry ores, that is: (a) a series of first cells (rougher) which constitute a rougher, copper-cobalt or a copper-nickel bearing froth; (b) a series of second cells (cleaners) for the purpose of cleaning the rough concentrated copper-cobalt or copper-nickel froth; (c) a series of third cells (differential flotation) to separate the copper and cobalt or copper nickel; (d) a series of fourth cells (cleaners) used to clean the cobalt or nickel. However, the system also can be altered so that (1) a first series of cells (differential flotation) separates the copper from the cobalt or nickel; (2) a series of second cells (cleaners) which are used for the purpose of cleaning the rough concentrated copper froth; (3 and 4) a third and fourth series of cells (cleaners) used to clean the cobalt or nickel. In the case of lead-zinc deposits the system will preferably employ: (1) a first series of cells (differential flotation) which separates the lead from the zinc; (2) a series of second cells (cleaners) used for the purpose of cleaning the rough concentrated lead froth; (3 and 4) a third and fourth series of cells (cleaners) to clean the zinc. If copper is present in large enough quantities another stage of differential flotation may be added to separate the copper from the lead as well as to introduce additional stages of cleaning. It also is possible to have a system arranged in reverse order for lead-zinc recovery; that is, the zinc is differentially floated first followed by a cleaning of the lead.

Various processes have been used to produce a rising flow of gas bubbles for froth flotation of mineral and/or metal constituents of many kinds of ores. For example, as was previously noted, air has been sparged into froth flotation tanks in order to separate certain copper minerals from other metal bearing minerals as well as from the waste or gangue material with which they are usually associated. Copper bearing minerals which have been successfully recovered through the use of sparged-gas-driven flotation cells would include: chalcopyrite, covellite, chalcocite, bornite, bournonite, molybdenite, tentrahedrite-tennantite and polybasite. Such methods have also been widely used to recover certain mineral and/or metal constituents of various sulphide minerals such as arsenopyrite, pyrite, pyrrhotite, marcasite, enargite, galena, boulangerite, sphalerite, argentite, pentlandite, tentrahedrite-tennantite, pyrargyrite, stephanite, proustite, millerite, nickeline cobaltite, glaucodot, and skutterudite.

In one widely practiced flotation process, copper porphyry ores are concentrated by a process which begins with the introduction of such an ore (in a ground and/or milled state) into a first stage, sparged-air-driven, froth flotation tank or system of such tanks in order to produce a rough, copper-molybdenite bearing froth. A resulting rough concentrate obtained from the froth of the first cell is then upgraded in a second stage, or system of such second stage, sparged-air-driven, flotation tanks. The froth product of the second stage tank(s) is then collected and reduced to a bulk concentrate which is then transferred to a third, differential flotation tank, or series of such differential flotation tanks, which also employ air sparging in order to separate the bulk concentrate's copper constituents from its molybdenite constituents. In such a third, differential flotation cell systems, copper minerals are typically "depressed" through the use of sodium hydrosulfide. Moreover, burner oil is often used to "float" the molybdenite component of the ore. The tailings taken from the bottom of the differential flotation cell usually contain the majority of the copper bearing mineral component of the ore. Upon removal from the bottom of the differential flotation cell they are usually pumped to a final copper concentrate thickener. The resulting thickened product, containing the copper concentrate produced by the overall flotation process, is then sent (very often by slurrying and pumping transport pipes) to a smelter. Again, this final copper concentrate also very often contains precious metal components of the ore such as gold, silver, platinum and palladium as well as other metal constituents such as selenium and/or any of the molybdenum component which was not recovered by the reverse flotation process.

The gas bubbles used in each of the above noted, prior art, sparged gas-driven first, second and third stage flotation cells are typically employed in concentrations of from about 25 to about 70 bubbles per cubic centimeter of the fluid media. Such sparged-gas-produced bubbles normally will have average bubble diameters of from about 0.2 to about 1.4 millimeters (mm). There are, however, some drawbacks to the use of such sparged-gas-driven flotation systems. For example, it has been found that sparged-gas-produced bubbles of such sizes are not particularly effective in associating themselves with certain smaller mineral particles (e.g., those having average diameters of 0.020 mm or less), especially when they are introduced into the first cell(s) of the differential flotation process previously noted.

Consequently, flotation cell systems employing smaller bubbles, and especially those relatively smaller bubbles generated by electrolytic decomposition of water, have been suggested and/or employed as alternatives and/or supplements to various kinds of sparged-gas-driven flotation cells. For example, bubbles produced by electrylic decomposition of water (e.g., hydrogen and/or oxygen) have been employed to recover certain metal and/or ore constituents from certain metal-containing sources. However, those sources wherein electrolytically produced bubbles have been successfully employed are in the general nature of relatively small quantities of toxic products produced by various industrial processes.

For example, some specific examples of electrolysis-bubble-driven flotation cell systems which have been used in various branches of the prior art would include:

(1) Articles by (a) E. H. Crabtree and J. D. Vincent entitled: Historical Outline of Major Flotation Developments and (b) by Pierre R. Hines and J. D. Vincent entitled: The Early Days *Froth Flotation*, 50th Anniversary Volume, Society of Mining Engineers, D. W. Fuerstenau, Editor.

(2) An article by Glembotsky et. al., entitled Selective Separation of Fine Mineral Slimes Using The Method of Electric Flotation, is found in a publication entitled Electrochemistry in Industrial Processing & Biology. It teaches use of electrolytically generated hydrogen, oxygen (and/or air bubbles) to float fine mineral particles such as those of manganese. With respect to electrolytic-bubble-driven flotation in general, this article notes a general agreement on the effectiveness of the following process parameters: a 0.5 to 1.0 meter height of the cell's liquid column, a current density of from 0.01 to 0.03 $A/cm^2$ and an electric power consumption of from about 0.5 to about 2.0 $KWh/m^3$.

The Glembotsky reference also implies the use of electroflotation for processing gold and silver in systems wherein these precious metals are the major economic minerals. They are specifically recovered by use of xanthate flotation agents. Those skilled in this art will appreciate that ore deposits containing gold or silver as major economic minerals also often contain chalcopyrite as a minor economic mineral and that a bulk sulfide flotation process is almost exclusively used for treatment of these ores, since selective separation of these minerals can be most economically done at a smelter. Concentrates containing say 10 ounces of gold, 10 ounces of silver, as the major economic minerals and 5% copper or lead as the minor economic minerals are quite profitable to ship to a smelter. Again, xanthate is used as a collector for these ores since economic gold values are often found in ariforus pyrite, marcasite, arsenopyrite, pyrrhotite, and chalcopyrite. However, a bulk sulfide flotation process such as that taught by Glembotsky is an unacceptable process for recovering base metal deposits such as copper porphyries, magmatic copper, lead-zinc and copper-lead-zinc deposits because these concentrates must contain a minimum of 30% and often better than 50% copper, lead, zinc, or nickel in order to economically justify shipment to a smelter. Furthermore, molybdenite must be cleaned to purities in excess of 90%. Consequently, xanthate is not typically used in their differential flotation because of its selective action against pyrite which is often a gangue mineral in copper, lead, and zinc ores. Nor is xanthate selective for certain specific economic minerals. Moreover, the cyanide and lime typically used in differential flotation of copper, lead, zinc ores would never be used with a gold-silver ore since the economic minerals would be depressed.

However, none of these references are particularly concerned with an efficient process of flotation of copper porphyry ores, copper magmatic ores, lead zinc ores, and copper lead zinc ores through the use of electroflotation systems used in conjunction with sparged gas driven flotation systems. Moreover, none of the above noted methods and/or apparatus were intended to be retrofitted into existing flotation cells. Moreover, none of the above methods would be as effective in collecting the wide range of particle sizes or as efficient in separating economic minerals during differential flotation.

(3) U.S. Pat. No. 4,101,409 teaches use of electrolytically generated gas bubbles to attract suspended solids. The process is specifically aided by introducing air into the tank to increase the gas available for flotation purposes.

(4) U.S. Pat. No. 4,623,436 teaches a method of removing impurities from a liquid by carrying out electrolysis at a pressure higher than atmospheric. The liquid is then exposed to atmospheric pressure and, hence, a decompression. Fine bubbles resulting from the decompression attach to impurities in the liquid.

(5) U.S. Pat. No. 3,552,571 teaches a "generalized" (no particular liquid such as water is emphasized) electroflotation device having certain hardware and geometrical details. For example, the device has a grate of electrodes positioned horizontally across the tank to produce a rising flow of gas bubbles produced by the electrolysis. The electrolysis action is supplemented by a distributor arm which rotates to evenly distribute the liquid which is to be electrolytically broken down.

(6) U.S. Pat. No. 3,726,780 discloses an electroflotation apparatus chiefly characterized by employment of having a tank whose height is several times its diameter and wherein a plurality of horizontal electrodes is disposed throughout the height of the tank. Typical liquids broken down in the tank by the electrolysis action may be milk water waste, oily waste water and dye plant waste.

(7) U.S. Pat. No. 3,853,736 teaches concepts very similar to those of U.S. Pat. No. 3,726,780 in that both systems utilize tanks having heights several times their effective diameters and a plurality of horizontal electrodes disposed throughout the respective tanks. Conduits and controls are provided to induce a downflow of liquid to be purified. Here again such a liquid might include oily waste water.

(8) U.S. Pat. No. 3,888,751 teaches a method of purifying waste water by the formation of oxygen and hydrogen bubbles from the electrolysis of water and directing a flow of said waste water into the bubbles in order to promote nuclei formation which aids in coagulation of the waste material around the nuclei. The formation of negative colloids of sulfides of various metals including those of gold and silver are noted.

(9) U.S. Pat. No. 3,898,150 teaches a electroflotation apparatus having grid structures having units wherein a plurality of parallel electrodes attached to a bus bar and embedded in a nonconducting support.

(10) U.S. Pat. No. 3,944,478 teaches electrolytic treatment of drainage in conjunction with a flocculation process; the process is carried out with aluminum ions or iron ions eluted by electrolysis.

(11) U.S. Pat. No. 3,970,536 teaches a method of treating an oil and particulate containing liquid coolant by flowing said coolant into a tank having several, alternating, oppositely charged plates. Under such conditions, the contaminates tend to agglomerate. Upwardly flowing gas bubbles generated by the plates entrain the agglomerated contaminates which are then skimmed from surface of the liquid.

(12) U.S. Pat. No. 3,975,269 discloses a method of purifying waste water by use of microbubbles of oxygen, hydrogen (or air) which attract contaminants in the waste water by differences in electrostatic charge in order to form embryo flocs which are buoyed to the surface. A polyelectrolyte is also added to aid in the formation of a full floc which is then collected.

(13) U.S. Pat. No. 3,989,608 teaches removal of hexavalent chromium (or other metal-ion contaminates) from cooling tower blowdown water. Its most novel feature is that the electrochemical operation is conducted under an evolved-hydrogen partial pressure greater than atmospheric pressure.

(14) U.S. Pat. No. 4,120,765 teaches confining electrolytically generated bubbles in a columnar treating region in order to get full use of the rising bubbles. Regulation of the bubble outlet relative to the liquid's surface can also be used to regulate the character of the foam produced by the bubbles.

(15) U.S. Pat. No. 4,202,767 teaches a method for purifying waste water by an electroflotation system wherein one of the electrodes is positioned horizontally above the other electrode. The electrodes themselves are formed of a perforated material.

(16) U.S. Pat. No. 4,224,148 teaches introduction of a galvanically charged particulate despension into a waste water stream and running the resulting mixture into treatment zones. The patent observes that gaseous oxygen adheres to certain particle surfaces. Oxidation is further promoted by pH adjustment with sulfur dioxide. The medium is then neutralized, brought to a pH of 10-11 and the contaminant is then precipitated with the aid of a galvanic grounding of said medium. Among other things precious metals may be recovered by this method.

All of the above noted processes may also be contrasted to mining operations wherein the cost of producing bubbles by electrolytic decomposition of water in the general context of refining large quantities of bulk ores has been heretofore regarded as prohibitive. This is especially true in the case of electrolytic flotation of copper porphyry, copper magmatic ores, lead-zinc ores, lead-zinc-copper ores. For example the cost of producing a pound of final copper concentrate (i.e., the concentrate product of the "third", differential flotation cell noted above), solely by means of electrolytically generated bubbles generated in first, second and third cells (analogous to the first, second and third, sparged-air-driven, cells noted above) would be several times the cost of using sparged air-driven systems.

SUMMARY OF THE INVENTION

Applicant has found that froth flotation of certain complex copper-containing ores can be markedly improved from the points of view of efficiency of recovery, operating costs and capital costs by the use of flotation cells which simultaneously employ smaller, electrolytically-produced, gas bubbles in conjunction with larger, sparged-gas-produced, bubbles. Again, the term "complex" should be taken to include so-called "simple" (i.e., one economic mineral and gangue, e.g., chalcopyrite or native copper) copper-containing ores. In its most fundamental aspects the herein disclosed process employs smaller bubbles (e.g., those having average diameters of about 0.060 mm to 0.008 mm) produced by electrolysis of certain polar liquids such as water in conjunction with those relatively larger bubbles (e.g., those having average diameters of from about 0.2 to 1.4 mm). Such smaller bubbles are co-mingled with the larger bubbles over at least some part of the overall height of the flotation cell(s) used in the practice of this invention. In other words, the smaller (0.2 mm to 1.4 mm) bubbles are thoroughly interspersed with the relatively larger bubbles (e.g., bubbles having average diameters of from about 0.2 to 1.4 mm) which are produced by sparging a gas into such a flotation cell. For the purposes of this patent disclosure, the term "smaller bubbles" should be taken to mean those which are at least about 1 order of magnitude smaller than those bubbles characterized as "larger bubbles". The sparged gases used in this process will most preferably be selected from the group of gases consisting of air, hydrogen, oxygen and mixtures thereof. Applicants have also found that the most preferred ratio of sparged-gas-produced bubbles to electrolytically produced bubbles for the practice of this invention is such that some portion of the flotation cell's liquid medium (media) contains from about 0.05 to about 15 volume percent sparged-gas-produced bubbles mixed with about 1.0 to about 2.0 volume percent electrolytically produced bubbles.

Applicant has found that the herein disclosed flotation process for separating a first portion (e.g., mineral bearing first portion and/or a first gangue portion) from a complex copper-containing portion can be employed in bulk flotation cells, reverse flotation cells and/or in differential flotation cells. However, applicant has also found that the herein disclosed process in particularly effective in improving the recovery efficiency of certain ores requiring differential flotation. In one particularly preferred embodiment of this invention, sparged-gas-produced bubbles are created in concentrations of from about 25 to about 70 bubbles per cubic centimeter of a flotation cell's liquid medium, especially water, (or media, e.g., in those cases where more than one liquid is employed) are comingled with bubbles produced by electrolysis of a liquid medium such as water and produced in concentrations ranging from about 50,000 to about 450,000 bubbles per cubic centimeter. Under such conditions, a preferred volume ratio of large bubbles to small bubbles in a given volume of fluid media is preferably from about 10:1 to about 15:1, i.e., the larger bubbles will occupy from 10 to 15 times as much of the volume of the fluid media as the smaller bubbles. Applicants also have found that bubble concentrations wherein at least some portion of the liquid media is occupied by from about 1.0 to about 2.0 volume percent of the electrolytically produced bubbles and by from about 0.05 to about 15 volume percent of sparged gas-produced bubbles are particularly useful in recovering the complex copper-containing ores which are the object of this invention. However, such volume ratios of large bubbles to small bubbles can vary with the nature of the ore being treated. However, as a general rule it can be said that in the practice of this invention the higher the relative volume of the small bubbles the greater will be the selectivity of the recovery operation. This invention also contemplates the use of this process in a series of cells wherein the bubble concentrations vary in different members of the series of cells. For example, applicant has found that certain cell systems wherein: (1) the electrolytically produced bubble concentration in a first cell is from 1 to 2 percent of the volume of the liquid media and the sparged gas bubble concentration is about 0.05 percent of the liquid media volume, (2) the electrolytically produced bubble concentration in a second cell is from 1 to 2 volume percent of the liquid media and the sparged gas bubble concentration is about 6–8% (and preferably about 7%) of the volume of the liquid medium and (3) the sparged gas concentration in a third is about 7 to 15% by volume of the liquid media, in the absence of any electrolytically produced bubbles, are particularly effective in recovering copper-containing ores of the type which are the subject of the processes of this patent disclosure.

Those skilled in this art will also appreciate that the processes of this patent disclosure may be carried out by the introduction or retrofitting of electrolysis equipment into existing sparged-air-driven flotation columns or flotation cells as well as by use of newly constructed flotation columns or cells. In its broadest sense the processes of this patent disclosure, the words "column" and "cell" can be used interchangably even though the terms may have technical distinctions (usually revolving the presence or absence of impellar system(s), column heights, etc.) which may be employed for other purposes.

In the most preferred embodiments of this invention, ore particles (raw ore, and/or ore concentrate particles produced by a preceding flotation cell) are introduced into a cell constructed according to the teachings of this patent disclosure and will: (1) descend, under the influence of gravity and/or centrifugally acting agitation, through a flotation zone occupied by a mixture of both larger (sparged-gas-produced) bubbles and smaller (electrolytic decomposition produced) bubbles which each ascend, albeit at different rates, in a flotation zone where particle/bubble contact is made, (2) selectively associate (with or without the aid of chemical flotation reagents) with the rising bubbles and (3) produce a froth on top of the cell's liquid media and a remainder product on the bottom through the influence of gravity (with or without the aid of chemical depressant reagents).

In one of its most preferred forms, the froth flotation process of this patent disclosure comprises: (1) separating a complex, copper-containing mineral from an ore comprised of a metal bearing mineral portion and a remainder portion, (2) improving the "grade" of a concentrate, and (3) increasing the percentage of ore valuable mineral in a given concentrate. Thus, in such complex copper-containing ores, use of terms such as "remainder portion" or "remainder" or "residue" should not be given any pejorative connotations since such materials may well contain other valuable minerals as well as completely unwanted gangue or waste materials. Again, however, this process is particularly effective in recovering certain selected minerals found in complex copper-containing ores such as copper porphyry ores, copper magmatic ores, lead-zinc ores and/or lead-zinc-copper ores. The herein disclosed process is particularly useful in differential flotation stages of overall flotation systems. Applicant's use of the expression "complex copper-containing" ores is intended, for the purposes of this patent disclosure, to include all four of these types of ores.

Stated in more specific terms, the process of this invention generally will comprise: (1) grinding a complex copper-containing ore prior to its introduction into a tank used to carry out the hereafter described flotation process; (2) partially filling said froth flotation tank with a liquid capable of undergoing electrolytic decomposition in order to define the upper level of a flotation zone occupied by said liquid and define a cleaning zone, located above the upper level of the liquid, which, during operation of the cell, is occupied by a froth and/or slime product produced by the flotation process; (3) introducing a feed product composed of a slurry of the ground complex copper-containing ore and a liquid (or an ore concentrate product of a previous ore refinement process stage) into the flotation cell at a first level which is located above a second level at which an electrolysis device is positioned in the tank; (4) operating said electrolysis device to electrolytically decompose the liquid and thereby forming a first group of gas bubbles in said liquid which have average bubble diameters smaller by about an order of magnitude than the average diameters of a second group of gas bubbles introduced by sparging a gas such as air or oxygen into said tank; (5) sparging a gas into the tank at a third level which lies below the first level at which the ore is introduced into said tank in order to produce a second group of gas bubbles having average bubble diameters about an order of magnitude larger than the first group of gas bubbles and in a volume such that the second group of bubbles occupies from about 0.1 to about 15 volume percent of the liquid of the flotation zone and the first group of bubbles occupies from about 1.0 to about 2.0 volume percent of the liquid of the flotation zone; (6) allowing the ore to descend under the influence of gravity and/or agitation, through a mixture of first and second bubbles arising through the liquid of the flotation zone, to a fourth level which defines the top of a collection zone located in the bottom of the tank such that during such descent ore particles are exposed to both the first group of gas bubbles produced by the electrolysis of the liquid and the second group of gas bubbles produced by the sparging in order that a first portion of the complex copper-containing ore (or concentrate) becomes associated with the rising gas bubbles and thereby producing a flotation product (which previously noted can be a mineral-bearing froth or a gangue bearing froth) in the cleaning zone of the tank while a second portion (remainder product) of said descending ore, which does not become associated with any of the rising gas bubbles, descends to a lowermost, fourth level in the tank; (7) collecting the remainder portion from the lowermost level of the tank and (8) collecting the resulting froth from the collection zone. It should again be noted in passing that for the purposes of this patent disclosure the terms "froth portion" and "remainder portion" may each contain economically valuable minerals depending on whether the flotation tank is being used for a bulk flotation process, a reverse flotation process or a differential flotation process. Again, however, the processes of this patent disclosure are particularly useful in context of carrying out differential flotation processes.

The above, generally defined, process may further comprise operating a second, a third, etc. electrolysis device at a level different from (e.g., above) the second level at which the first electrolysis device is operated, but still below the first level where the ore is introduced. This process also can be augmented by subjecting the cell's or column's liquid medium (or media) to shear forces produced by an impeller operating below the first level where the ore is introduced into the tank. Most preferably, however, such an impeller device should be operated above the second level where the electrolysis device is located or, in an alternative mode of operation, by operating such an impeller device below the second level where the electrolysis is located, but above the fourth level in the bottom of the tank to which the remainder portion of the ore descends. Similar efficiency improvements may be obtained in configurations where the first level within the tank at which the ore is introduced is a level which is below the top surface of the liquid.

It should also be noted in passing that any liquid capable of being decomposed into gas bubbles can be employed in the practice of this invention, but the best results from both the economic and the technical point of view are usually obtained when the liquid is a polar liquid such as water. However, mixtures of liquids, and especially mixtures of liquids which are polar solvents, can be employed as the cell's liquid media. This invention also contemplates the introduction of "pure" gases such as oxygen and/or hydrogen by sparging them into the tank. However, these oxygen and/or hydrogen bubbles will have "larger" diameters, e.g., average diameters on the order of about 0.2 to about 1.4 mm (i.e., diameters comparable to those of sparged air). As previously noted, and regardless of the chemical species of the bubbles, smaller ore particles tend to resist being captured by larger bubbles and larger particles tend to be missed by smaller bubbles. However, a high degree of mixing of the large and small gas bubbles, is a preferred condition in at least some portion of the cell's flotation zone. Again, however, some portions of certain differential flotation circuits require a higher degree of selectivity; consequently selected tanks and/or stages may well have reduced volumes of larger bubbles. Consequently, applicant prefers to employ processes wherein the liquid media is occupied by about 0.1 to about 15 percent by volume of the sparged gas produced bubbles and by about 1.0 to 2.0 percent by volume of electrolytically-produced bubbles.

One particularly preferred continuous process for differential flotation of complex copper-containing ores, e.g., copper porphyry ores, copper magmatic ores, lead-zinc and copper-lead-zinc ores will be a four stage flotation process comprised of: (1) grinding the ore prior to introduction into a tank or series of tanks used to carry out the flotation processes, and especially the case where the product of the grinding processes is composed of a slurry of ground ore and water to form a complex copper-containing ore pulp the ratio of which consists of approximately two parts water to one part ore; (2) partially filling a first stage, rougher flotation, tank (or series of such tanks) with a liquid to define a flotation zone occupied by said liquid and a cleaning zone, located above said first liquid which is occupied by a froth product produced by a rougher flotation process and wherein said first liquid is capable of decomposing under electrolysis to form a first group of gas bubbles in said liquid which have average diameters smaller than an average diameter of a second group of gas bubbles introduced into said first tank by sparging; (3) introducing collectors, activators, depressants and/or pH control reagents (again, such reagents may be added at different stages during the process; in the grinding mill, to the ore pulp just prior to its introduction into the flotation cells, to the flotation cells or may be added at several places in the overall circuit); (4) introducing a slurry of ore and water at a first level which is located above a second level where an electrolysis device is positioned in the first tank; (5) operating an electrolysis device at the second level of the first tank to decompose the liquid in order to form a first group of gas bubbles which rise through a substantial part of the depth of the liquid which defines the collection zone of the first tank of the rougher stage; (6) sparging a second group of gas bubbles into an ore bearing pulp of the first tank at a third level which lies below the first level at which the ore is introduced into said first tank of the rougher stage; (7) mixing the pulp by means of a centrifugally acting mechanical agitator with sparged-gas bubbles and bubbles produced by electrolysis of the liquid in a ratio such that some given volume of the flotation zone's liquid media is occupied by from about 1% to about 2% of a gas produced by the first group of electrolytic bubbles and from about 0.05% to about 15% of a gas produced by the second group of sparged-air-bubbles; (8) associating the economic mineral portion of the ore with the bubbles and rise to the surface; (9) passing the remaining portion of the pulp to the next tank or series of tanks for continued treatment by exposing the particles to more bubbles until they reach the end of the cell bank where they are transferred to a tailings pond; (10) collecting the froth from the top of the mixture forming the first concentrate; (11) transferring a portion of a first metal bearing mineral concentrate to a second, rougher cleaner flotation tank or series of such tanks; (12) transferring a remaining portion of the first metal bearing mineral to a regrinding circuit; (13) partially filling a first, scavenger flotation tank or series of tanks with a second liquid to a second cleaning zone located above said second liquid which is occupied by a froth produced by a scavenging flotation process and wherein said first liquid is capable of decomposing under electrolysis to form a first group of gas bubbles in said liquid which have average diameters smaller than an average diameter of a second group of gas bubbles introduces into said first tank by sparging; (14) introducing the slurry of ore and water from the regrinding operation at the first level which is located above a second level where an electrolysis device is positioned in the first tank of the scavenger stage; (15) operating an electrolysis device at the second level of the first tank of the scavenger stage to decompose the liquid in order to form a first group of gas bubbles which rise through a substantial part of the depth of the liquid which defines the collection zone of the first tank of the scavenger stage; (16) sparging a second group of gas bubbles into the pulp of the first tank at a third level which lies below the first level at which the ore is introduced into said first tank of the rougher stage; (17) mixing the ore bearing pulp by means of a centrifugally acting mechanical agitator with sparged-gas bubbles and bubbles produced by electrolysis of the liquid in a ratio such that some given volume of the flotation zone's liquid media is occupied by from about 1% to about 2% of a gas produced by the first group of electrolytic bubbles and from about 0.05% to about 15% of a gas produced by the second group of sparged-air bubbles; (18) associating the economic mineral portion of the ore with the bubbles and rise to the surface; (19) passing the remaining portion of the pulp to the next tank or series of tanks for continued treatment by exposing the particles to more bubbles until the end of the cell bank where it is transferred to a tailings pond; (20) collecting a portion of the froth from the top of the mixture forming the scavenger concentrate; (21) recirculating another portion back to the regrinding circuit; (22) partially filling a third, rougher cleaner flotation tank or series of tanks with a liquid to define a third collection zone occupied by a liquid media and a third cleaning zone occupied by a froth produced by a rougher cleaning flotation process and wherein the first liquid media is capable of decomposing under electrolysis to form a first group of gas bubbles having average diameters smaller than the average diameters of a second group of gas bubbles introduces into said first tank by sparging; (23) introducing a portion of the concentrate from the rougher stage and a portion of the concentrate from the scavenger stage into a third tank or series of tanks; (24) mixing an ore bearing pulp by means of a centrifugally acting mechanical agitator with sparged-gas bubbles and bubbles produced by electrolysis of the liquid in a ratio such that some given volume of the flotation zone's liquid media is occupied by from about 1% to about 2% of a gas produced by the first group of electrolytic bubbles and from about 0.05% to about 15% of a gas produced by the second group of sparged-air bubbles; (25) associating the economic mineral portion of the ore with the bubbles and rise to the surface; (26) passing the remaining portion of the pulp to a next tank or series of tanks for continued treatment by exposing said particles to more bubbles; (27) collecting the froth from the top of the mixture forming the cleaner concentrate of a higher grade than the rougher concentrate or scavenger concentrate; (28) transferring the metal bearing mineral concentrate to a differential flotation tank or series of tanks; (29) introducing into the fourth liquid of said fourth tank a reagent capable of depressing one of the major economic minerals (30) partially filling the differential flotation tank or series of tanks with a liquid to define a third collection zone occupied by said fourth liquid and a fourth cleaning zone occupied by a froth produced by differential flotation process in which an electrolysis device at the second level of the first tank to decompose the liquid in order to form a first group of gas bubbles which rise through a substantial part of the depth of the liquid which defines the collection zone of the first tank of the differential flotation stage; (31) introducing the slurry of ore and water at the first level which is located above a second level where an electrolysis device is positioned in the first tank; (32) operating an electrolysis device at the second level of the first tank of the differential flotation stage to decompose the liquid in order to form a first tank to decompose the liquid in order to form a first group of gas bubbles which rise through a substantial part of the depth of the liquid which defines the collection zone of the first tank; (33) sparging a second group of gas bubbles into the pulp of the first tank at a second level which lies below the first level at which the ore is introduced into said first tank; (34) mixing an ore bearing pulp by means of a centrifugally acting mechanical agitator with sparged-gas bubbles and bubbles produced by electrolysis of the liquid in a ratio such that some given volume of the flotation zone's liquid media is occupied by from about 1% to about 2% of a gas produced by the first group of bubbles and from about 0.05 to about 15% of a gas produced by the second group of bubbles; (35) associating the economic mineral portion of the ore with the bubbles and rise to the surface; (36) passing the remaining portion of the pulp to the next tank or series of tanks for continued treatment by exposing the particles to more bubbles; (37) collecting the froth from the top of the mixture forming the fourth concentrate; (38) smelting the fourth metal bearing constituent to obtain a metal contained in said fourth metal bearing mineral constituent; (39) introducing into the fifth liquid of said fifth tank a reagent capable of activating a last major group of economic minerals; (40) introducing the slurry of ore and water at the first level which is located above a second level where an electrolysis device is positioned in the first tank of the final cleaning circuit; (41) operating an electrolysis device at the second level of the first tank to decompose the liquid in order to form a first group of gas bubbles which rise through a substantial part of the depth of the liquid which defines the collection zone of the first tank of the rougher stage; (42) sparging a second group of gas bubbles into the pulp of the first tank at a third level which lies below the first level at which the pulp from the differential flotation stage is introduced into said first tank of the final cleaning stage; (43) mixing the ore bearing pulp by means of a centrifugally acting mechanical agitator with sparged-gas bubbles and bubbles produced by electrolysis of the liquid in a ratio such that some given volume of the flotation zone's liquid media is occupied by from about 1% to about 2% of a gas produced by the first group of electrolytic bubbles and from about 0.05% to about 15% of a gas produced by the second group of sparged-air bubbles (it should also be noted at this point that some of the tanks used during this cleaning stage may not be mechanically agitated and the metal bearing mineral concentrate is placed in the system by (44) introducing said concentrate at a first level which is located above a second level where an electrolysis device is positioned in the tank; (45) operating an electrolysis device at the second level of the tank to decompose the liquid in order to form a first group of gas bubbles which rise through a substantial part of the depth of the liquid which defines the flotation zone of the tank; (46) sparging a second group of gas bubbles into the pulp of the first tank at a third level which lies below the first level at which the ore is introduced into said first tank; (47) allowing the ore to descend from the first level under the influence of gravity to a fourth level located in the bottom of the tank such that during said descent the ore is exposed to both the first group of gas bubbles produced by the electrolysis of the liquid and the second group of gas bubbles produced by the sparging of air in a ratio such that some given volume of the flotation zone's liquid media is occupied by from about 1% to about 2% of a gas produced by the first group of electrolytic bubbles and from about 0.05% to about 15% of a gas produced by the second group of sparged-air bubbles; (48) associating the economic mineral portion of the ore with the bubbles and rise to the surface; and (49) collecting the froth from the top of the mixture forming the final concentrate.

It should again be noted that regardless of the number of electrolysis devices employed, the processes of the patent disclosure are particularly suited to mineral bearing complex ores requiring separation by differential flotation such as copper porphyry ores, copper magmatic ores, lead-zinc and copper-lead-zinc ores.

In another highly preferred embodiment of this process, the electrolysis device is comprised of two, opposing electrically charged plates which are each mounted around the inside of the tank in a vertical orientation or on the bottom of the tank in a horizontal position. Such electrodes are preferably mounted in a plexiglass housing which serves the following purposes of providing a framework to support the electrodes and preventing the hydrogen and oxygen gases from mixing together inside the cell and providing spacing between the electrodes which prevents them from shorting together. The space between the electrodes contains an electrolyte supported in a matrix, a solid state electrolyte, or a solid polymer electrolytic conductor in an electrolytic solution. The oxygen bubbles are allowed to disseminate into the flotation cell. The hydrogen formed is more preferably allowed to flow out of the cell where it can be dried to remove the water vapor and compressed to provide a marketable by-product of the flotation process. Reversing electrodes and allowing the hydrogen to be used for flotation and the oxygen pumped off is less preferred. However, such a process may have application for the flotation of coal by means of the herein disclosed process. This partially follows from the fact that hydrogen would have a reducing effect, and would tend to depress any pyrite present in coal.

A highly preferred embodiment of retrofitting differential flotation circuits, electrolysis devices can be introduced into flotation tanks at strategically selected locations, by varying the ratio of the volume of sparged-gas bubbles with the volume of bubbles produced by the electrolysis devices, i.e., differential flotation stages, cells where reagents are introduced and cells where extreme cleaning is necessary, the grade and recovery of the final product can be increased.

The overall efficiency of the process from the points of both recovery efficiency and economics can be improved by certain further modifications of the electrolysis device(s), from the points of view of geometrical configuration, construction material, chemical species of the ingredient and/or the electrodes and the level of electrical power delivered. For example, it should be noted that within certain limits, a given bubble size can be obtained by means of certain hereinafter discussed parameter changes and exploitation of the high and specific physicochemical activity of hydrogen and oxygen bubbles.

By way of some more detailed examples, electrolysis of the liquid media can be carried out between two, opposing, electrically charged plates which each are constructed in the form of two substantially horizontal, vertical, or diagonal screens which span across a substantial portion of a cross section of the tank. Such screens each should have a mesh size which allows descending ore particles to freely pass through each of said screens as the particles descend to the fourth level.

Moreover, the electrolysis of the liquid is best carried out between two plates made of different materials. For example, an oxygen producing anode screen of the electrolysis device will be made of a first kind of metallic construction material and the hydrogen producing cathode screen of the electrolysis device will be made of a second kind of metallic construction material. Even further refinements in this process may be obtained wherein the electrolysis of the liquid is carried out by an oxygen producing anode screen made up of wire-like elements of a first metallic construction material having vertical cross sectional areas greater than those of the hydrogen producing cathode screen. That is to say the cathode can be made up of wire-like elements of a second metallic construction material having cross sectional areas less than the cross sectional areas of the screen elements which make up the anode screen.

In other preferred embodiments of this process, the screen-like electrolysis device, located at the second level, is comprised of at least one electrolysis device which is mounted to the inside of the tank such that two, opposing, electrically charged plates of such device have a substantially vertical orientation. Another preferred variation of the process is best carried out when the electrolysis device at the second level is comprised of a group of separate electrolysis devices each comprised of two, opposing electrically charged plates which are each mounted around the inside of the tank such that said plates have a substantially vertical orientation.

It should also be noted that the surfaces of such electrolysis devices may be provided with a suitable catalytic surface for the discharge of oxygen. That is to say that the surface may be treated to facilitate the release of, say, oxygen at the generating surface. For example such anodes can be constructed from heavily nickeled iron or stainless steel. The nickel deposit prevents iron oxide from going into solution. Similarly, the surface of the cathode can be treated to reduce the sites for nucleation of hydrogen bubbles which may have a detrimental affect on the flotation of certain minerals. In an alkaline medium the cathode can be made of mild steel or iron. In an acid medium a lead anode is used. A lead oxide is formed on the surface of a lead cathode which prevents it from dissolving in an acid solution. These materials are used to minimize over voltage and increase the efficiency of the system. Those skilled in this art will also appreciate that the configuration of the anode and cathode also may cause a coalescing of hydrogen bubbles and thus reduce the negative affects of hydrogen.

Again, in some highly preferred embodiments of this invention the above-noted screen type electrodes can be replaced by a series of can-shaped electrolysis units such as the one depicted in FIG. 3. They are mounted around the inside walls of the tank and hence do not "span" the tank in the manner of the screen-like electrodes. It should also be noted in passing that these layered units may completely replace the screen-like grids depicted in FIGS. 1 and 2 or they may augment the action of the screen-like electrolysis units. In either case, the electrodes can be inserted into an existing flotation circuits of either the "cell" type or the "column" type. Such layered electrodes are preferably mounted on a plexiglass plate insulating them from the metal walls of the tank. Anode screens made of stainless steel, titanium, or heavily nickeled iron, having mesh sizes from $\frac{1}{8}"$ to $\frac{1}{4}"$ are preferred. Cathode screens made of steel, iron, and lead, having mesh sizes ranging from about $\frac{1}{8}"$ to about $\frac{1}{4}"$ are preferred.

The close proximity of the electrodes, the use of an electrolyte, and the proper selection of electrode materials all serve to keep the cost of electroflotation at a minimum. Current density at the anode also is an important consideration, since too high a current density may cause passivity or reduced recovery. On the other hand, too low current density causes the anode to dissolve in an undesired valence state and result in reduction of the number of electrolytic bubbles produced. Flotation cells employing electrolytic devices producing current densities of from about 0.02 A/cm$^2$ to about 0.04 A/cm$^2$, and most preferably, near about 0.025 A/cm$^2$ with electric power consumptions of from about 1.25 to about 2.0 KWh/m$^3$ are highly preferred in the practice of the herein disclosed processes. Moreover, a direct current (D.C.) power supply may be especially designed to maintain a constant current to the electrodes to conserve power. At current prices, electroflotation according to the teachings of this patent disclosure would cost from $0.05–$0.10 per ton to the cost of flotation. It may be possible to reduce costs further. The selection of electrode material, electrode spacing, positioning in the flotation cell and circuit along with an efficiently designed power supply keep costs between $0.05–$0.10 per ton for most copper porphyry ores. Protection devices also should be placed in the power supply in order to prevent damage to its components, as well as to provide a simple means of reversing polarity to correct polarization of electrodes for starting up after a shutdown. However, this cost would be more than compensated for by the 1% to 10% increase in recovery efficiency (and, in the case of new units, reduced capital costs) over cells and column employing only sparged gas for their flotation means. A graphic representation of such cost savings is found in FIG. 15.

Those skilled in this art will of course appreciate that oxygen and hydrogen are the products of electrolysis of water. They will also appreciate that electrolytic oxygen bubbles rise more slowly than air bubbles and thereby increasing the probability of contact. Hence, the presence of electrolytic oxygen may also promote certain chemical aspects of the collection mechanism. That is to say the oxygen may promote the chemiabsorption onto a mineral particle's surface. For example, a mineral surface may first be oxidized to a metal oxy sulfur species which then exchanges with collector ions in solution to form a metal collector compound. Sulfides are electrolytic conductors, and can provide a supply of electrons to support electrode reactions at the surface. Electrolytically produced hydrogen on the other hand has a very low density compared to electrolytic oxygen or air and therefore is much more buoyant. Hence hydrogen bubbles rise very fast and have little chance to contact the mineral particles.

In certain other preferred forms, the above-described flotation cell system, which is fundamentally based upon the simultaneous use of both a sparged gas such as air or oxygen and a electrolytically produced gas such as the oxygen and hydrogen produced by the electrolytic decomposition of water, may be provided with other kinds of process equipment such as froth concentrations or thickeners, etc., positioned between the different members of the first, second, and third cells of an overall system constructed according to the teachings of this invention. Thus, for example, the "second" cell will most preferably comprise several such second cells connected in series with each other. However such cells may also be connected with intermediate processing equipment. Hence the cell "series" or cell circuit may include other cells which do not simultaneously employ both sparged gas and electrolytically produced gas. Similarly the third, differential flotation "cell" may in effect be a "series" of third, differential flotation cells which also may have other kinds of equipment known to the art interjected between the various elements of the series of flotation cells. Similarly such equipment may be placed between the various stages or groups of an overall cell circuit such as that shown in FIG. 4.

In other preferred embodiments of this invention, especially as it relates to the recovery of copper porphyry ores, the chemical reagent scheme can be varied somewhat to produce optimum results especially when such chemical modifications are carried out in combination with the electro-parameters of the flotation process. Examples of the use of certain specific chemical reagent schemes would include:
a. Froth production through the use of pine oil, cresylic acid. glycol, or long chain alcohols.
b. The use of dithiophosphates, dithionocarbonates, dixantogene blast furnace oils, petroleum products, wood tar creosotes, coal tar creosotes and coal tars or combinations thereof as collectors.
c. Preferred pyrite inhibitors will include: cyanide, lime, cement and trisodium phosphate.
d. Particularly effective gangue inhibitor and electrolyte compounds will include those those containing sodium carbonate.

One highly preferred reagent scheme for the recovery of complex copper-containing ores by the flotation processes of this patent disclosure might contain the following reagents carrying out the functions indicated:
a. The use of pine oil, cresylic acid, glycol, or long chain alcohols as frothers.
b. The use of dithiophosphates, thicarbonates, xanthogen formates, allyl xanthate esters and mercaptobenzothiazole, or combinations of these reagents as collectors.
c. The use of sodium carbonate and/or sulfuric acid gangue inhibitors and/or electrolytes.

BRIEF DESCRIPTION OF THE DRAWINGS

FIG. 3 is a cut away side view of an alternative, "layered", electrolysis device which can be mounted to the inside wall or bottom of a given flotation tank.

FIG. 4 is a cut-away side view of another version of the layered, electrolysis device which can be mounted on the wall or bottom of a flotation tank for the production of oxygen bubbles for flotation.

FIG. 5 is a flow diagram of a typical flotation cell system having first, second and third groups of flotation cells.

DESCRIPTION OF PREFERRED EMBODIMENTS

Figure 1:
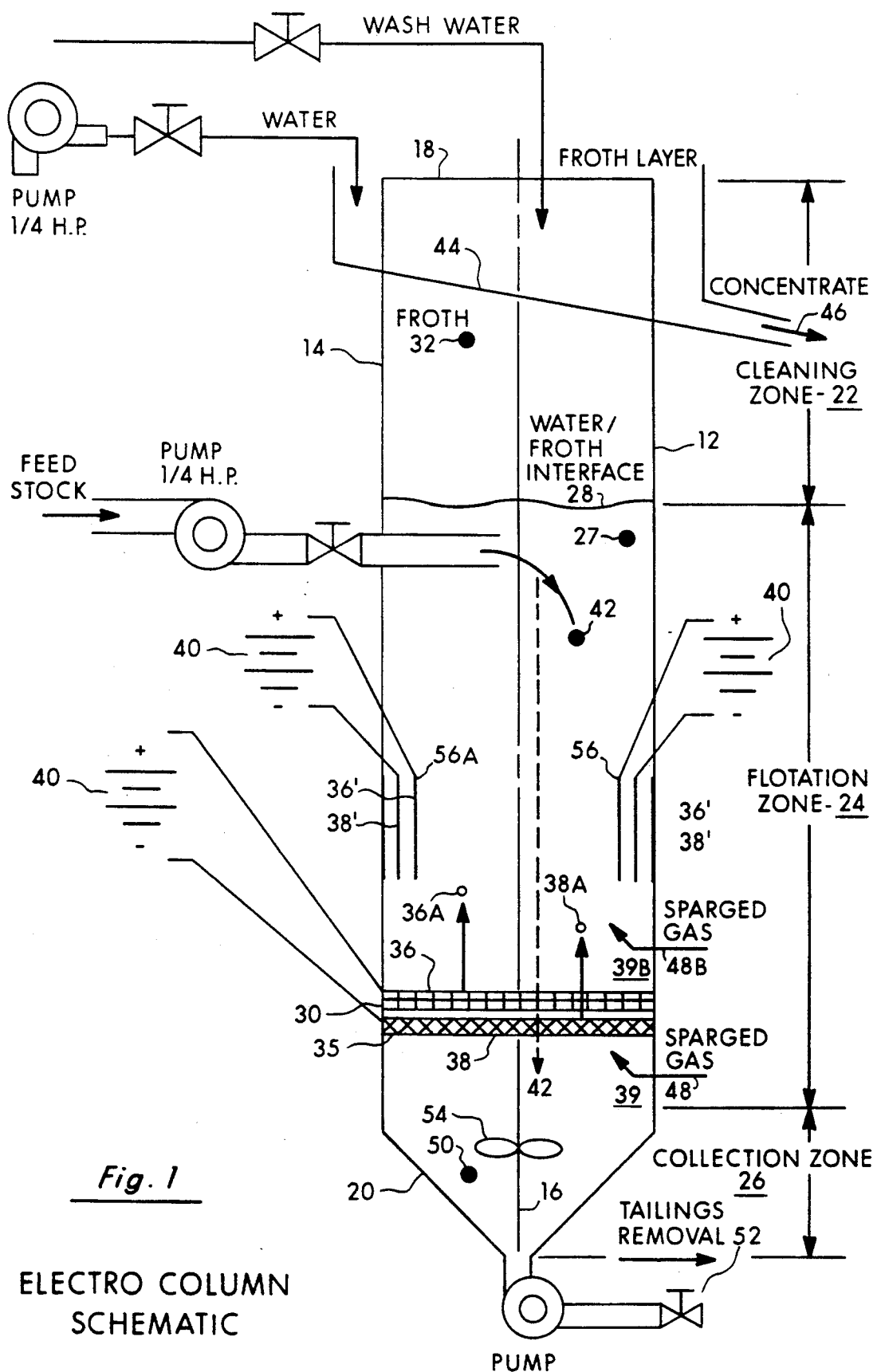
FIG. 1 is a cut away side view of a flotation tank for carrying out the herein disclosed process having a single grid system.

With reference to FIG. 1, an electroflotation apparatus constructed according to the teachings of this patent disclosure is generally indicated by reference numeral 10. A single tank 12 can be used to carry out the fundamental process of this invention; that is to say it can be used to carry out a flotation process wherein descending complex copper-containing ore or concentrate descends through a flotation zone occupied by a liquid medium (or media) containing mixture of small and large bubbles which are ascending through the liquid medium. The tank 12 can have any configuration, but a generally cubic shaped tank having a square cross section defined by a planar sidewall 14 formed around a vertical center axis 16 is preferred. The tank 12 is open at its top 18. Preferably, the tank 12 is enclosed at its bottom by a conical shaped portion 20 that tapers downwardly towards the vertical center axis 16 of said tank 12. In some of the more preferred embodiments of this invention the flotation process carried out in tank 12 will be carried out in a series of such tanks such as those depicted in FIGS. 4 and 6.

The tank 12 of FIG. 1 is shown divided into three main vertical zones: a cleaning zone 22, a flotation zone 24 and a collection zone 26. The vertical depth of these zones 22, 24, and 26 are generally defined by the operation of the flotation process taking place within said tank 12. For example, as generally indicated by the accompanying arrows, the depth of the liquid 27 medium contained in the tank 12, between said liquid's top or upper boundary level 28 down to the level of the grid system 30 defines the vertical depth of the flotation zone 24. The cleaning zone 22 extends from the upper boundary level 28 of the liquid occupying the tank 12 during operation to the top 18 of the tank 12. Thus, a froth product 32 formed by the flotation process generally occupies the cleaning zone 22. Similarly, the lower boundary 34 of flotation zone 24 is defined by the lower surface 35 of the electrolysis system 30. It is generally comprised of a first grid 36 (e.g., the upper grid 36 shown in FIG. 1) and a second grid 38 (e.g., the lower grid 38 shown in FIG. 1).

Electrolytically produced bubbles 36A are shown emanating from grid 36 and other electrolytically produced bubbles 38A are shown emanating from grid 38. In one preferred embodiment of this invention, grid 36 can be connected to the positive plate of a source of electrical current 40 (e.g., a battery is shown for purposes of illustration only), while the lower grid 38 is connected to the negative plate of said source of electrical current 40. It should again be noted that the preferred liquids for carrying out this electrolytic decomposition process are polar liquids; and for reasons of economics and/or technical efficacy water is the most preferred of such polar liquids.

Feed stock material 42 is shown being delivered by a pumping system which delivers such material into the tank 12. The feedstock material 42 could be: (1) fresh, ground ore delivered from local ore processing facilities (e.g., ore grinding and milling devices), (2) a froth production product taken from a cleaning zone of a preceding flotation cell, or (3) a "tailings product" taken from a collection zone (such as the one shown as item 20 in FIG. 1) of a preceding flotation cell. The incoming feed product 42 could also contain other raw materials including portions of fresh ore and/or remilled tailings products from a preceding cell. A froth collection device 44 can be any one of several kinds known to the art such as, for example, those which employ a water flow collection system such as that depicted in FIG. 1. Those skilled in the art will also appreciate that the froth 32 so collected may be concentrated to a concentrate product 46 before it is delivered to the next point in the overall process such as, for example, before it is delivered to a subsequent flotation cell comparable to the cell depicted in FIG. 1.

Again, the flotation process carried out in tank 12 is driven by two distinct sources of bubbles. A first group is produced by electrolysis of the liquid medium or media (e.g., oxygen and hydrogen bubbles 36A and 38A produced by the electrolysis of water) and a second group of bubbles, depicted as bubbles 48A in FIG. 1, which are produced by sparging a gas into the liquid medium 27. The gas sparging device(s) 48 employed to produce the second group of bubbles may be of several varieties known to the art and in certain embodiments of this invention, one or more additional sparging device(s) 48B may be located throughout the tank 12. In some of the most preferred embodiments of this process the sparged gas 48A will be introduced at a level 39 located below the lowest level 35 of the grid system 30.

Thus, in a highly preferred embodiment of the process, the sparged gas bubbles 48A arise from their introduction level 39, pass through the electrical grids 38 and 36 and become mixed with the gas bubbles 36A and 38A produced by the electrolysis device 30. Introduction of the sparged gas at level 39 below the lowest level 35 of the grid system 30 is preferred because the particles which descend through the grid system 30 will tend to be larger particles. That is to say the smaller particles will more likely have been already associated with the smaller bubbles produced above the grid system 30. Hence, the larger bubbles (e.g., those having average diameters of from about 0.2 to about 1.4 mm) will be operating mostly upon larger particles (e.g., those having average diameters of greater than about 0.020 mm) in the region between the lowest level 43 of the grid system 30 and the level of introduction 39 of sparged gas bubbles 48A.

The use of such an arrangement also implies that the product 50 in collection zone 26 will tend to be comprised of particles which were not captured by either the small bubbles 36A and 38A produced by the electrolysis device 30 or by the large bubbles 48A produced by the sparging operation. This product 50 may be removed by a tailings removal device 52 such as a pump indicated in FIG. 1. Those skilled in this art also will appreciate that such "tailings" may yet contain valuable ore constituents which may be recovered by subsequent operations.

An impeller system 54 may also be operated within the tank 12 in order to enhance material flow and/or ingredient mixing operations. One particularly preferred impeller system is introduced as an integral part of an alternative layered electrolysis device 56 which is more fully described with respect to FIG. 3. A series of these alternative layered electrolysis devices such as noted as items 56, 56A in FIG. 1 can be mounted around the interior of the tank's wall 14 or on conical portion of tank 20. Such alternative layered electrolysis devices 56, 56A, etc., may be used in place of the grid system 30 or they may be used to supplement the bubble producing function of said grid system 30. To this end, the alternative electrolysis devices 56, 56A are shown with electrically charged plates 36' and 38' which are analogous in function to the electrically charged plates 36 and 38 of the grid system 30.

Figure 2:
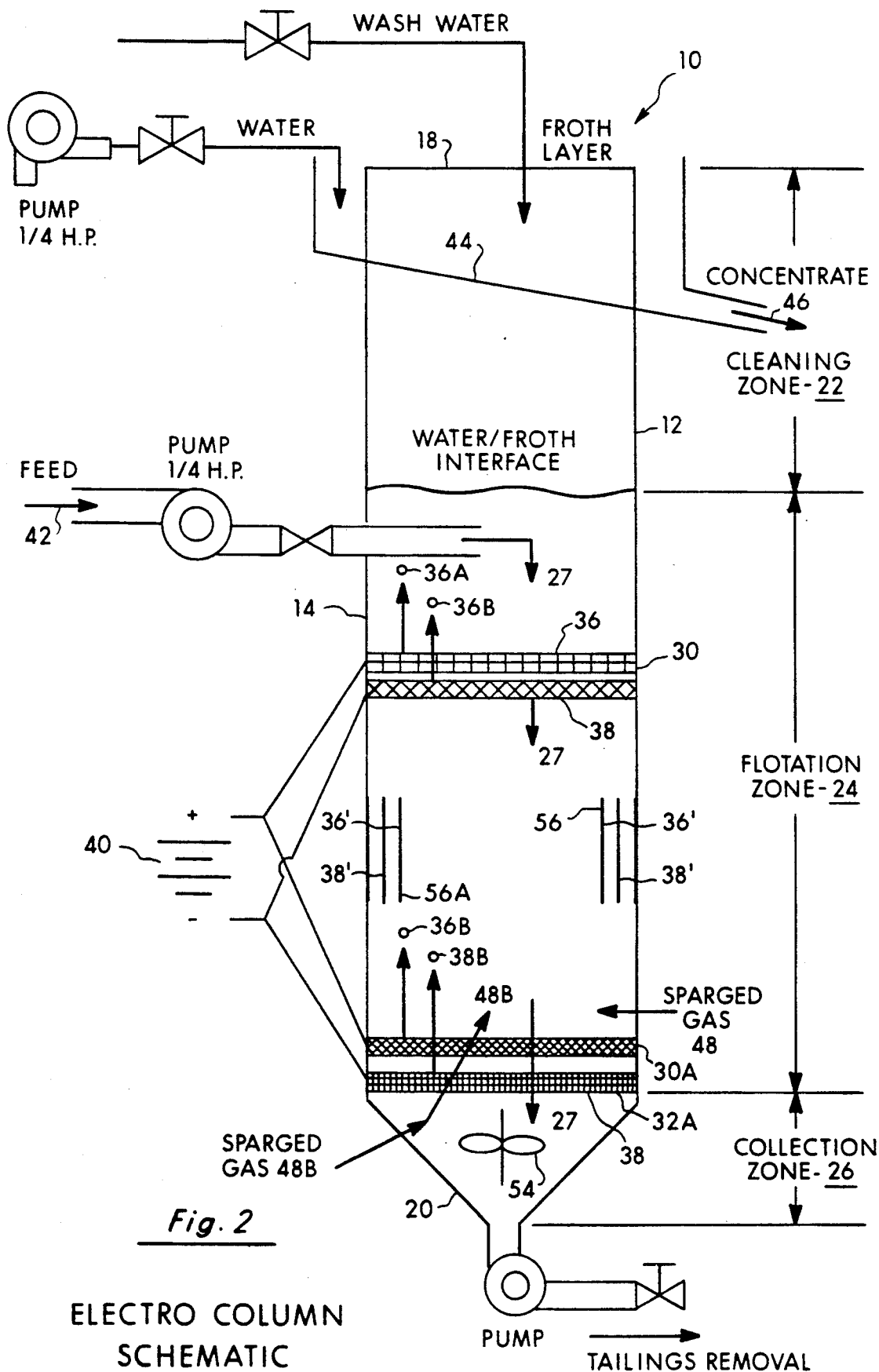
FIG. 2 is a cut-away side view of a flotation tank carrying out the herein disclosed process through the use of a two grid system.

FIG. 2 depicts another version of the hereindisclosed process, namely one in which a second grid system 30A is introduced. Note that the introduction of this second grid system 30A has the effect of lowering the depth of the flotation zone 24 to a lower level 32A which coincides with the bottom grid of the second grid system 30A. A second source of sparged gas 48B is shown being introduced below the second grid system 30A. Here again, alternative type electrolysis devices 56 and 56A can be employed in place of, or supplemental to, one or both of the grid systems 30 and 30A.

FIG. 3 depicts a representative alternative "layered" electrolysis device 56 which can be mounted to the inside of the tank wall 14 or bottom in the manner depicted in FIGS. 1 and 2. Again, such alternative electrolysis devices 56 can be used to augment the action of the grid systems 30 shown in FIGS. 1 and 2 or they may be used to totally supplant such grid systems. The alternative electrolysis device 56 depicted in FIG. 3 is shown made from some representative materials in some representative dimensions. For example, its anode 58 is shown made of perforated, 0.060" steel plate while its cathode 60 is depicted as being made of a ⅛" steel plate mounted on a Lucite ® insulator 62. The bolts 61 and washers 63 which hold the electrodes 58 and 60 to the insulating plate and provide a proper relationship to the plates are most preferably made of an insulating fiber material.

FIG. 4 depicts another version of a layered electroflotation device which can be mounted in any position within a flotation cell or tank. The layered grid system is generally comprised of a first grind 36 (e.g., the upper grid 36 shown in FIG. 4), a semi-permeable membrane which is an electrolytic conductor 67 (e.g., below the first grid FIG. 4). A layer of liquid medium 79 containing a high concentration of electrolyte 65 (e.g., shown below the semi-permeable membrane FIG. 4). The liquid medium 79 is supplied by tube 82. A second grid 38 (e.g., shown below the first layer of liquid medium FIG. 4). A second layer of liquid medium 79 containing a high concentration of electrolyte 65A (e.g., shown between second grid and lucite framework). The liquid medium 79 is supplied by tube 82A. The lucite framework 62 which supports the grid system also acts as an insulator. Bolts 61 holds the framework together. Bolt holes 59 for mounting device to cell or tank.

In one preferred embodiment of this device, grid 36 is connected to the positive plate of a source of electrical current 40 (e.g., a battery is shown for purposes of illustration only), for the production of oxygen bubbles only for flotation. While grid 38 is connected to the negative plate of said source of electrical current 40 for the production of hydrogen bubbles. Hydrogen is pumped off as a by-product 85 through tube 81 and 81A (e.g., the tube shown in FIG. 4).

In another preferred embodiment of this device, grid 36 is connected to the negative plate of a source of the electrical current 40 and grid 38 is connected to the positive plate. Hydrogen is utilized for flotation and oxygen is vented off.

FIG. 5 depicts a system 66 of flotation cell tanks, e.g., tanks $10_1$, $10_2$, and $10_3$ which is especially adapted for flotation cell recovery of copper porphyry ores. As previously noted such a system usually comprises at least three distinctive flotation cells, i.e., a first, rougher flotation cell tank $10_1$ (which typically receives ground ore 68), a second, rougher clearer flotation cell tank $10_2$ (which typically receives a froth flotation product 70 of the first, rougher flotation tank 1) and a third, reverse flotation cell tank $10_3$ (which receives a froth flotation product 72 from the second, rougher cleaner flotation cell tank. A "tailings" product 74 of the third, reverse flotation cell tank $10_3$ contains most of the copper constituent of the ore. Said tailings product 74 is recovered from the collection zone 26 of tank $10_3$ and is sent to a smelter 76 for final recovery of the copper, gold, silver, etc. constituents of the tailings product 74. The froth flotation product 78 of the differential flotation process carried out in the third, differential flotation cell tank $10_3$ typically contains most of the molybdenum content of the ore. FIG. 4 also illustrates that the "first", rougher flotation cell tank may in fact be a series of such first tanks $10_1$, $10_{1-A}$, $10_{1-B}$, etc. which are generally arranged to accept the production products of a preceding tank. Similarly, the second, rougher cleaner flotation cell tank $10_2$ may also comprise a series of "second" tanks $10_2$, $10_{2-A}$, $10_{2-B}$, etc. Likewise the "third" differential flotation cell tank $10_3$ may comprise a series of tanks $10_3$, $10_{3-A}$, $10_{3-B}$, etc.

Figure 6:
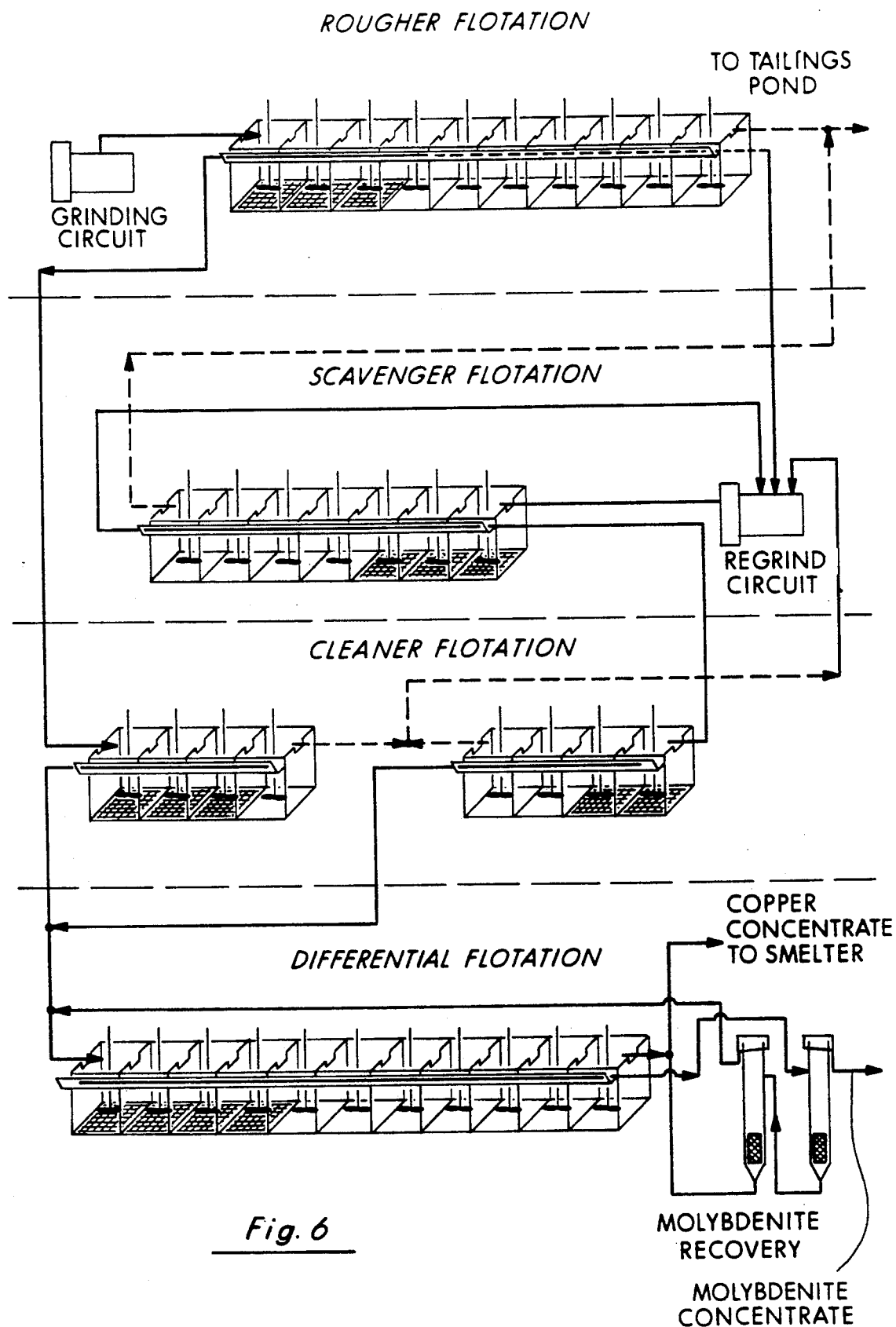
FIG. 6 is an expanded, more detailed version of the system depicted in FIG. 5.

FIG. 6 depicts a system for carrying out a more detailed version of the process of this invention having several scavenger cleaner circuits.

Figure 7:
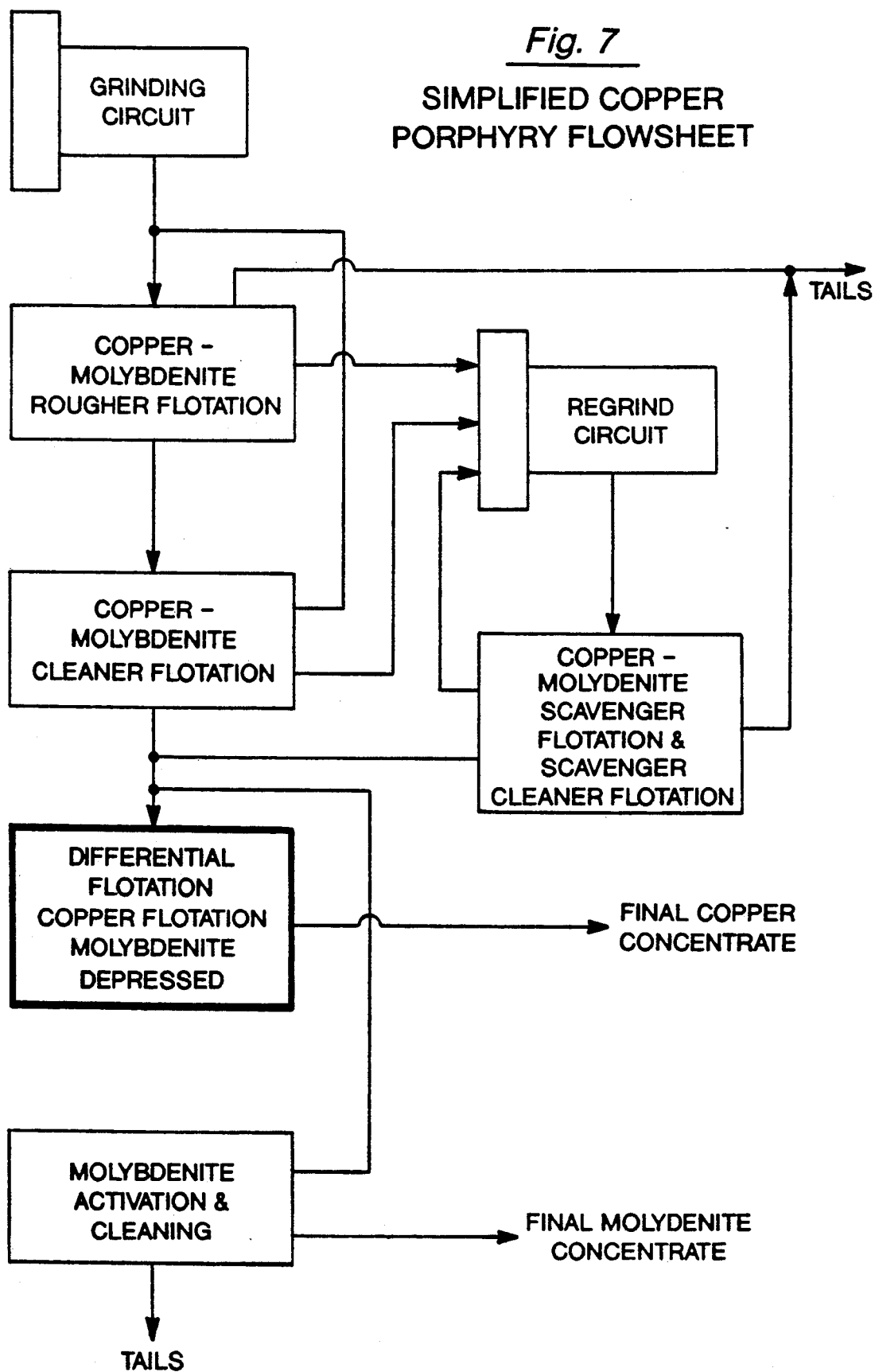
FIG. 7 is a flow diagram for recovering copper porphyry ores in a system emphasizing use of this process in a differential flotation stage of an overall prior art process.

FIG. 7 is a flowsheet for a version of the herein disclosed process particularly adapted for recovery of copper prophyry ores.

Figure 8:
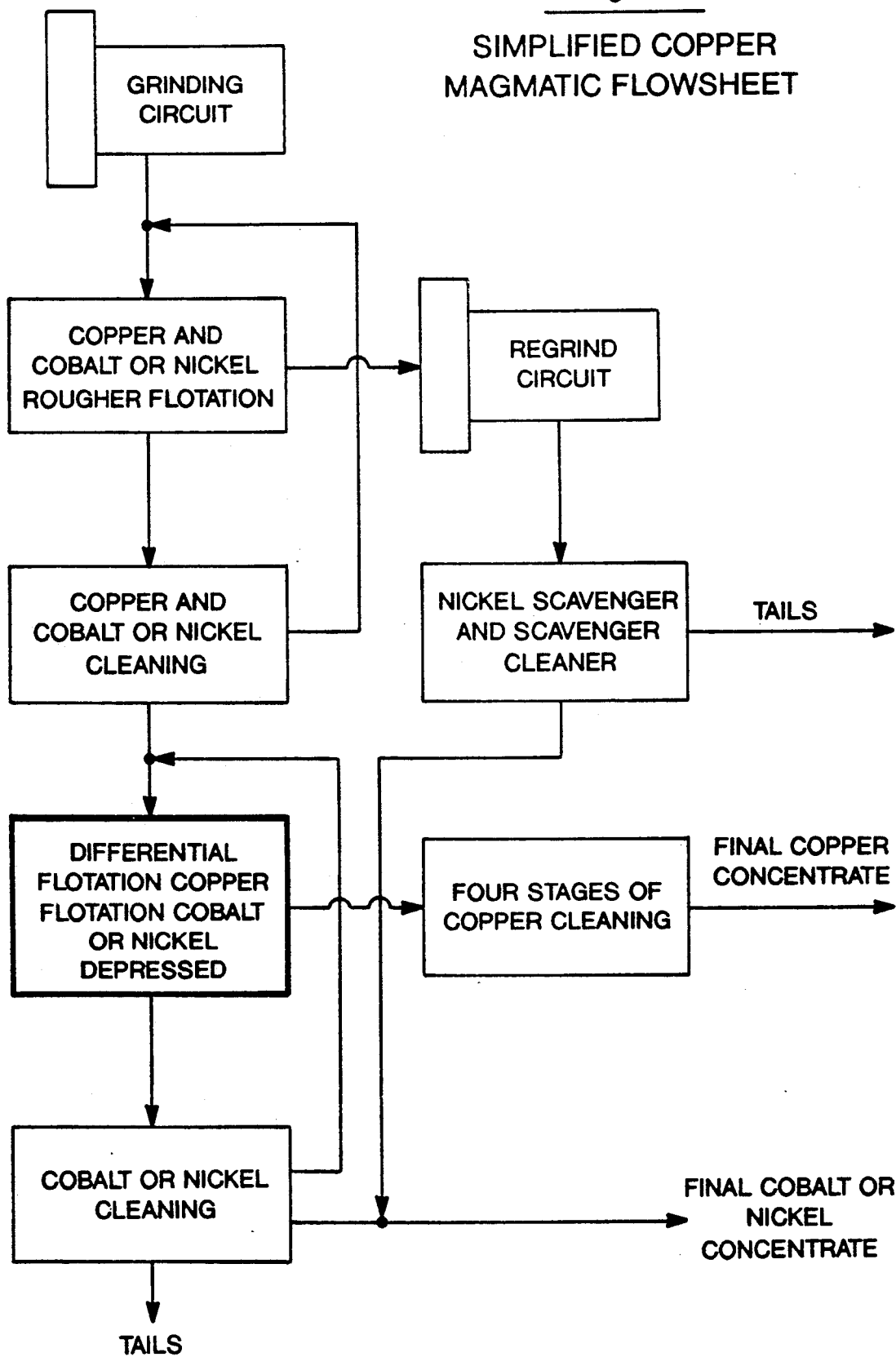
FIG. 8 is a flow diagram for recovering copper magmatic ores in a system emphasizing use of this process in a differential flotation stage of an overall prior art process.

FIG. 8 is a flowsheet for a version of the herein disclosed process particularly adapted for recovery of copper magmatic ores.

Figure 9:
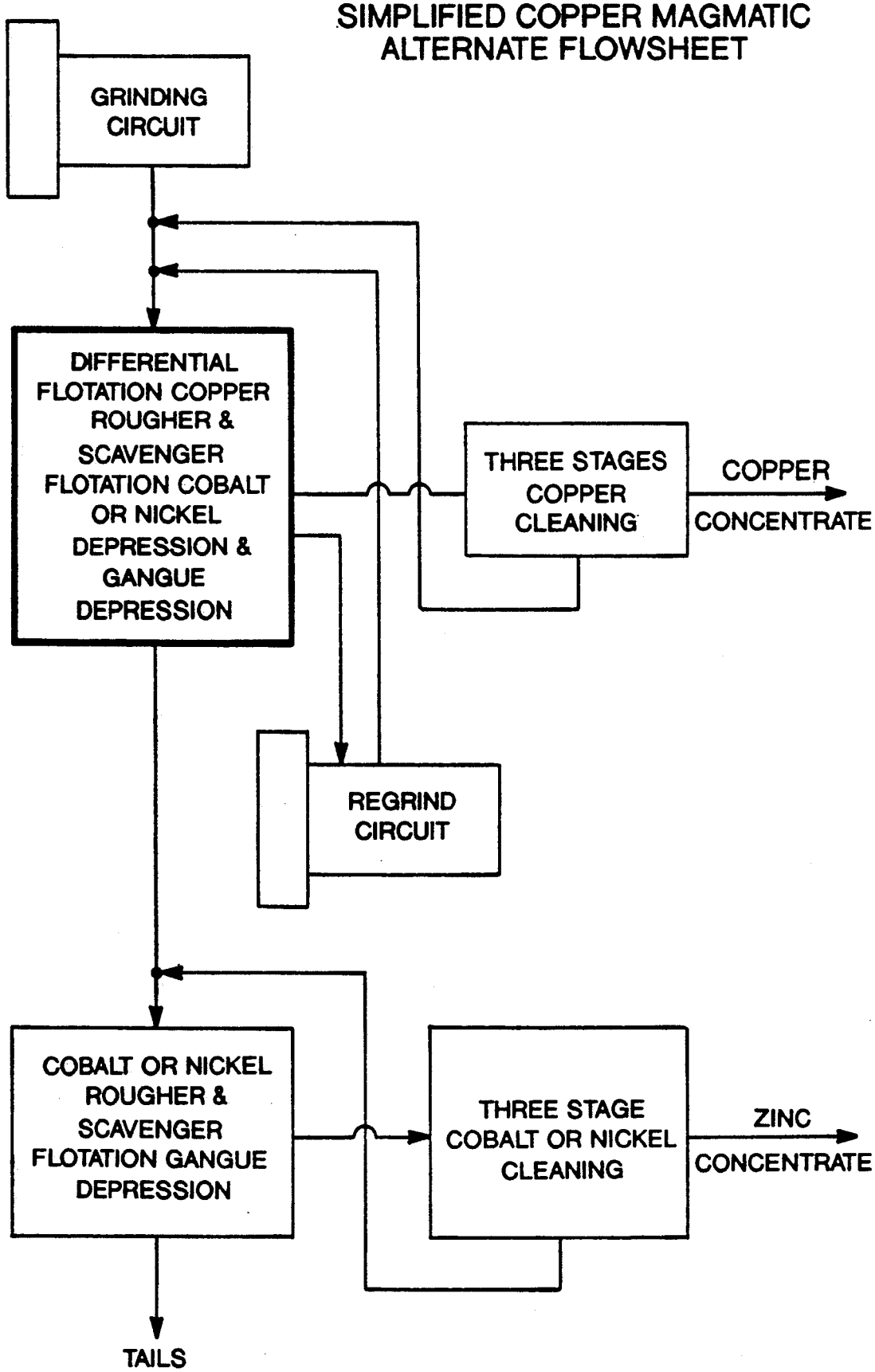
FIG. 9 is a flow diagram for recovering copper magmatic ores in a system emphasizing use of this process in a differential flotation stage of an overall prior art process.

FIG. 9 is a flowsheet of a version of the herein disclosed process directed at recovery of copper magmatic ores.

Figure 10:
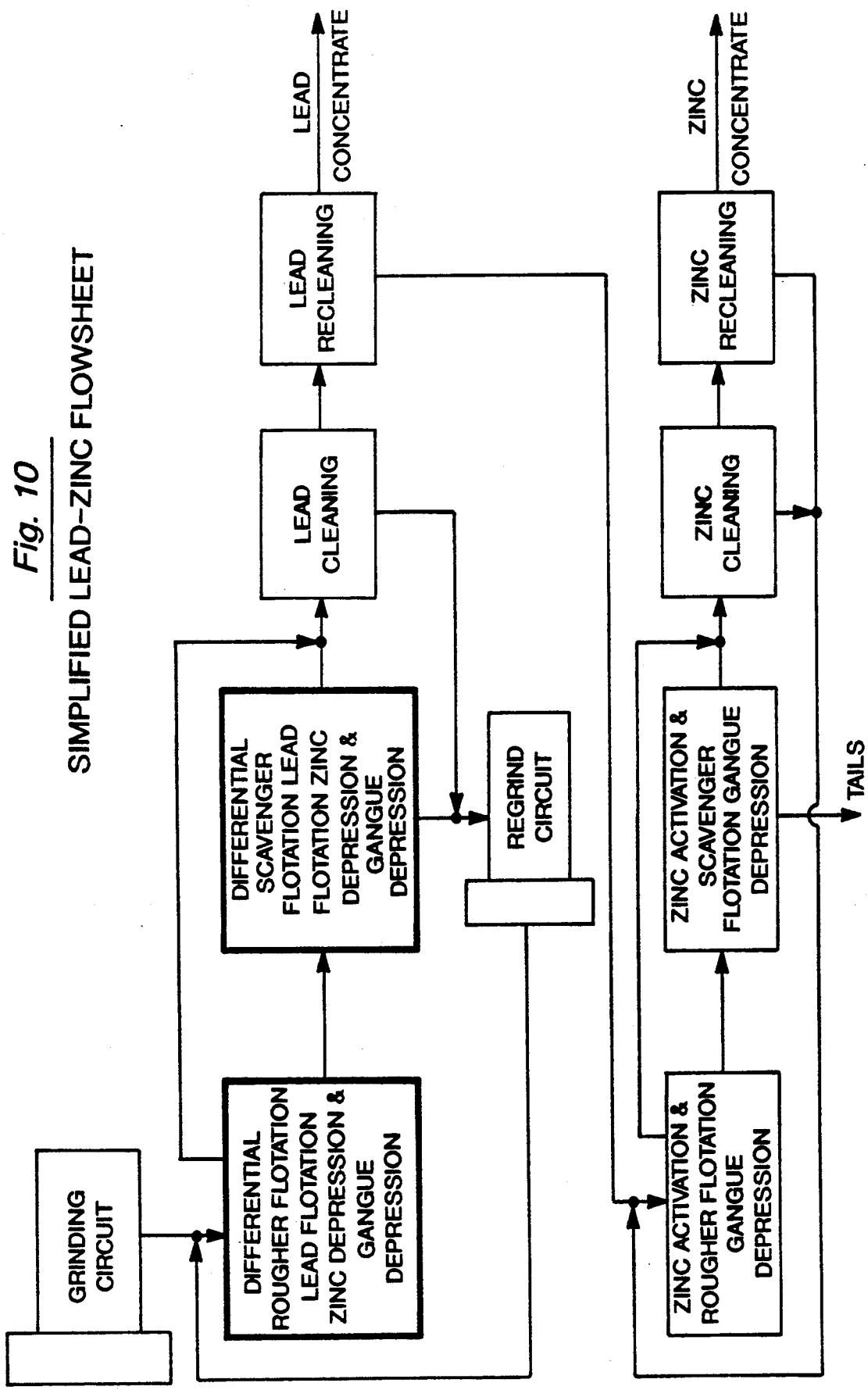
FIG. 10 is a flow diagram for recovering lead-zinc ores in a system emphasizing use of this process in a differential flotation stage of an overall prior art process.

FIG. 10 is a flowsheet of a circuit for recovering a lead-zinc ore through the processes of this patent disclosure.

Figure 11:
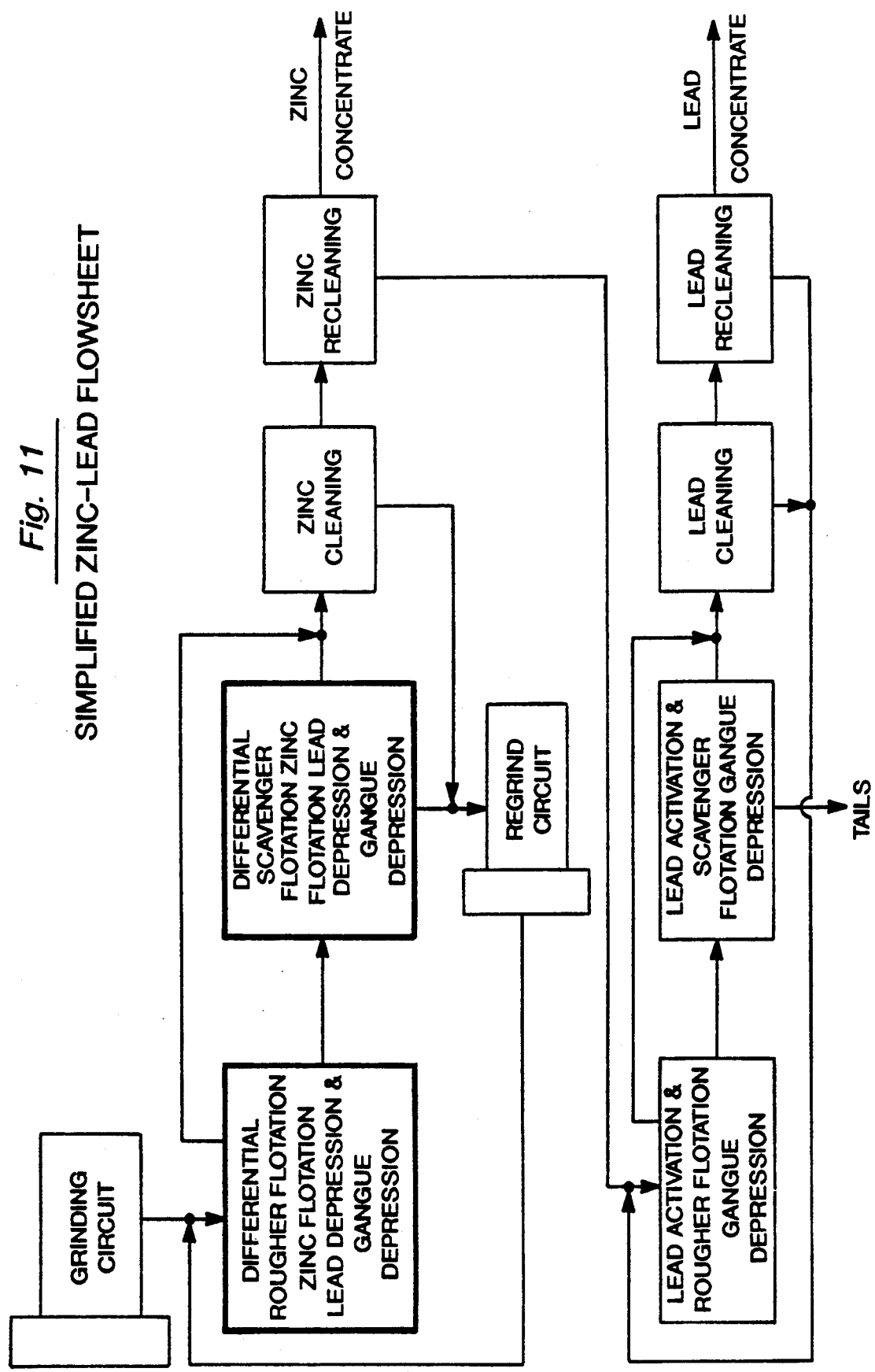
FIG. 11 is a flow diagram for recovering zinc-lead ores in a system emphasizing use of this process in a differential flotation stage of an overall prior art process.

FIG. 11 is a flowsheet for recoverying a zinc-lead ore by the processes of this invention.

Figure 12:
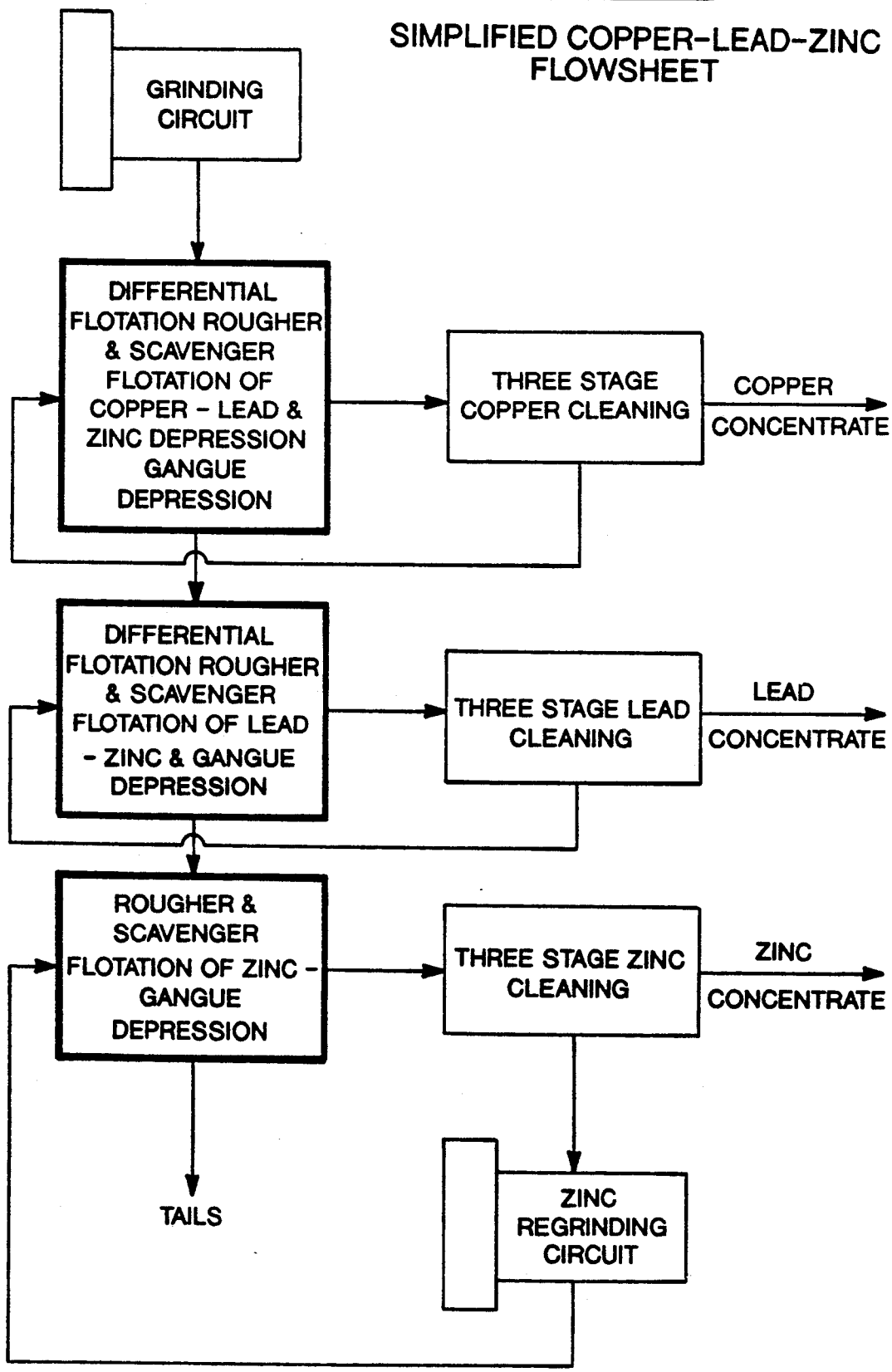
FIG. 12 is a flow diagram for recovering copper-lead-zinc ores in a system emphasizing use of this process in a differential flotation stage of an overall prior art process.

FIG. 12 is a circuit for recovering a copper-lead-zinc ore by the herein disclosed processes.

Figure 13:
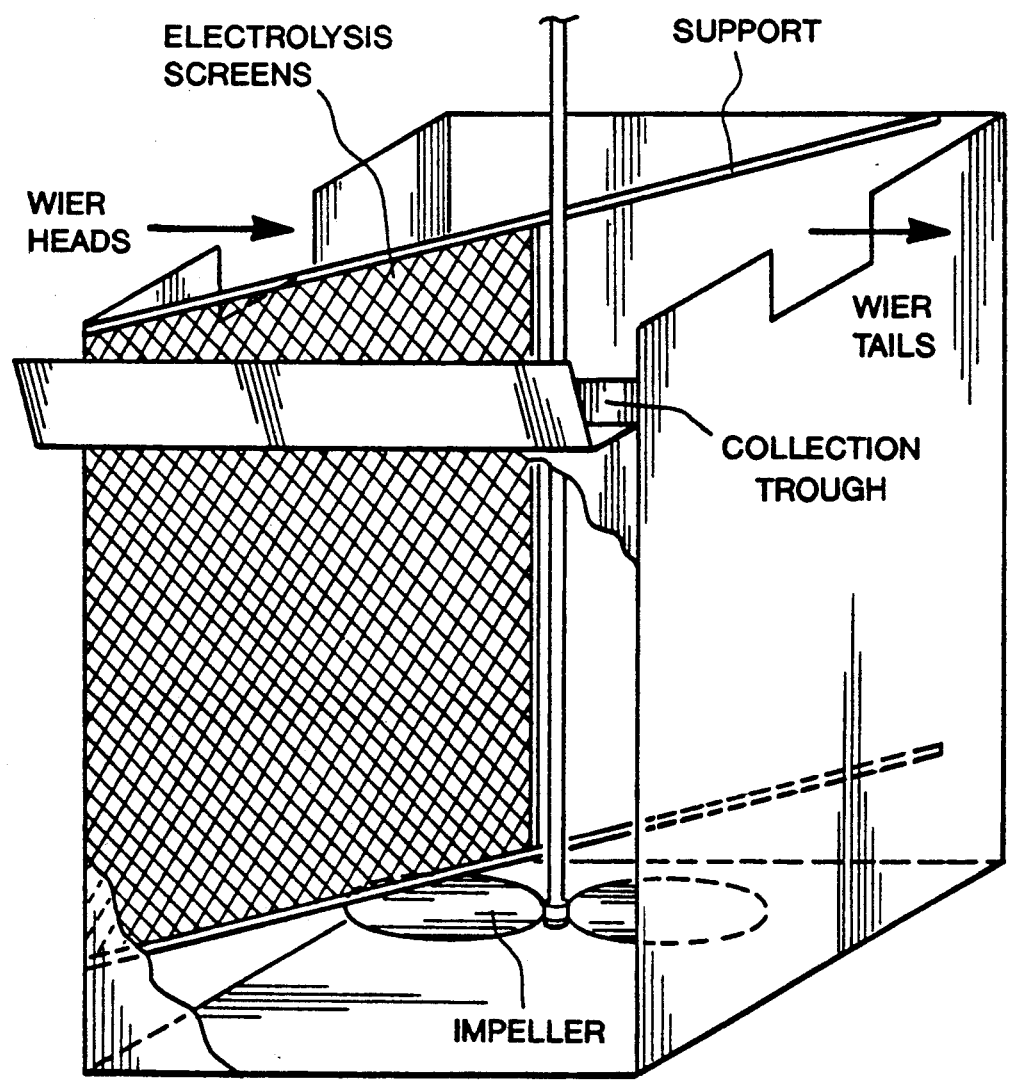
FIG. 13 depicts a flotation device wherein the grid is mounted in a vertical fashion in the cell.

FIG. 13 depicts a electrolytic cell device suited for carrying out the processes wherein a grid screen is mounted vertically (and diagonally) in a flotation cell.

Figure 14:
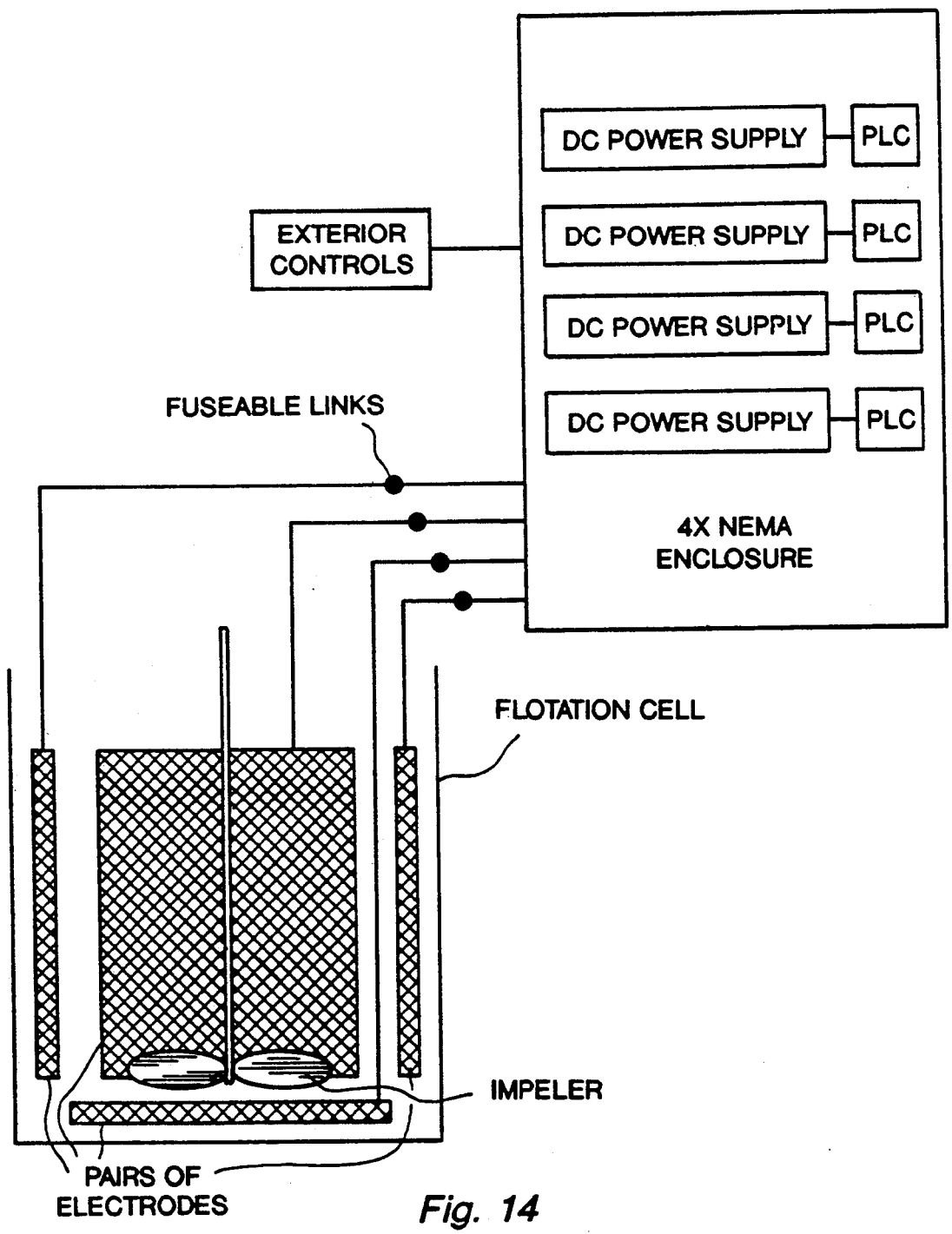
FIG. 14 depicts layered electrolytic devices mounted on walls and bottom in a cell and some preferred electrical details in applicant's system.

FIG. 14 is a suitable system for connecting the electrolytic devices used in carrying out the herein disclosed processes, especially in the contect of retrofitting such a device in a flotation cell.

Figure 15:
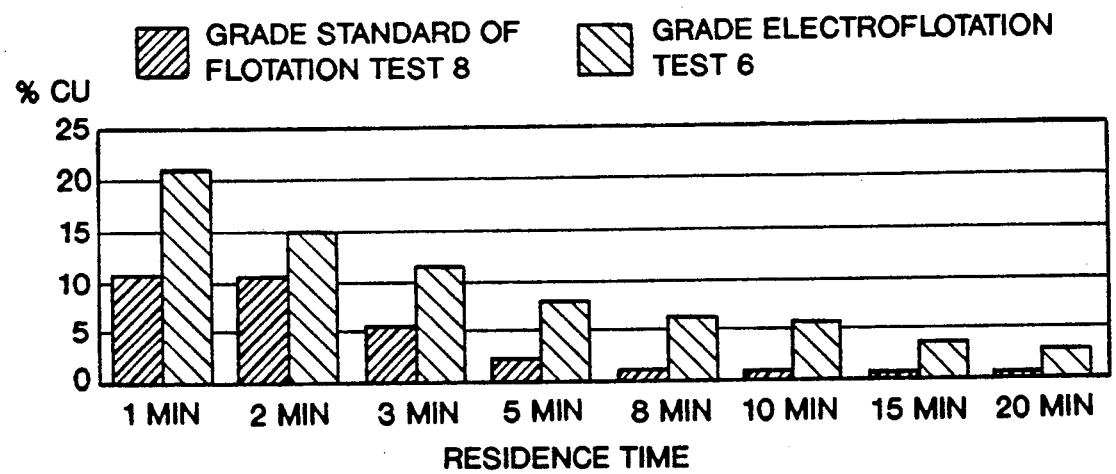
FIG. 15 is a bar chart depicting the improvement in grade when electrolytic bubbles comprise 1% to 2% of the cells volume and 0.05% of the volume of the cells is occupied by sparged air bubbles vs. the grade when sparged air alone is used.

FIG. 15 is a grade comparison (for various residence times) of copper recovery of the herein disclosed process versus standard flotation using cells employing only sparged air to drive the flotation process.

Figure 16:
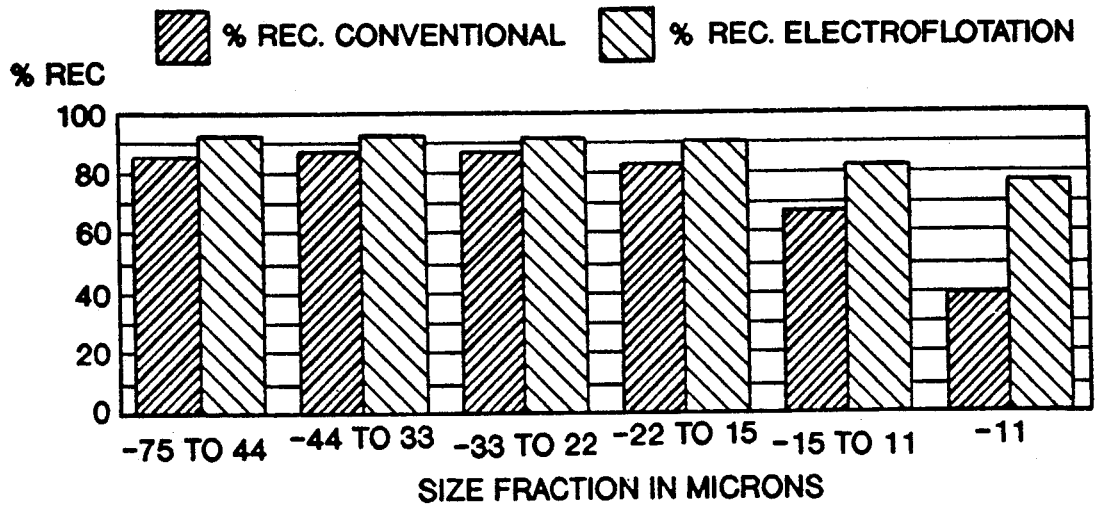
FIG. 16 is a bar chart depicting the economic advantage over all size fractions of ore particles of applicant's process over comparable prior art systems which are driven exclusively by the introduction of sparged air.

FIG. 16 is a bar chart depicting the economic advantage over all size fraction of ore particles of applicant's process compaired to prior art systems which are driven exclusively by the introduction of sparged air.

It should be understood that various changes may be made in the details and arrangements of the processes and apparatus components, as well as in the procedures and functions carried out by them, without departing from the scope of the invention which consists of the matter shown and described herein and set forth in the hereinafter appended claims.

Thus having disclosed my invention, what is claimed is:

1. A flotation process for separating a first metal-bearing mineral constituent from a second metal-bearing mineral constituent which are incorporated in an ore comprised of at least a first metal-bearing mineral portion, a second metal-bearing mineral portion and a remainder portion, said process comprising:
  (1) grinding the ore prior to introduction into a rougher, flotation tank;
  (2) partially filling said rougher flotation tank with a liquid to define a collection zone occupied by said liquid and a cleaning zone, located above said liquid which is to be occupied by a froth produced by a flotation process carried out in the rougher, flotation tank and wherein said liquid is capable of decomposing under electrolysis to form a first group of gas bubbles which have average diameters smaller than the average diameters of a second group of gas bubbles introduced into said rougher, flotation tank by sparging;
  (3) introducing the ore into the rougher, flotation tank at a first level which is located above a second level where an electrolysis device is positioned in the rougher, flotation tank;
  (4) operating an electrolysis device at the second level of the rougher, flotation tank in order to decompose the liquid and thereby form a first group of gas bubbles which rise through a substantial part of the depth of the liquid which defines the collection zone of the rougher, flotation tank;
  (5) sparging a second group of gas bubbles into the liquid of the rougher, flotation tank at a third level which lies below the first level at which the ore is introduced into said rougher, flotation tank;

(6) allowing the ore to descend under the influence of gravity to a fourth level located in the bottom of the rougher, flotation tank such that during said descent the ore is exposed to both the first group of gas bubbles produced by the electrolysis of the liquid and the second group of gas bubbles produced by the sparging in order that a first metal-bearing mineral portion and a second metal-bearing mineral portion of the ore become associated with the rising gas bubbles and thereby produce a metal-bearing mineral froth in the cleaning zone of the rougher, flotation tank while a remainder portion of the ore descends to the fourth level in said rougher, flotation tank;

(7) collecting the remainder portion from the bottom of the rougher, flotation tank;

(8) collecting the metal-bearing mineral froth from the collection zone of the rougher, flotation tank and concentrating said froth to form a first stage, metal-bearing mineral concentrate and transferring said concentrate to a rougher, cleaner flotation tank;

(9) partially filling a rougher, cleaner flotation tank with a liquid to define a collection zone occupied by said liquid and a cleaning zone located above said liquid which is to be occupied by a metal-bearing material froth produced by a flotation process in which gas bubbles are introduced into said rougher, cleaner tank at a third level by sparging and wherein said liquid is capable of decomposing under electrolysis to form gas bubbles which have average diameters smaller than the average diameters of gas bubbles introduced into said rougher, cleaner flotation tank by sparging;

(10) introducing the first stage, metal-bearing mineral concentrate from the rougher flotation tank into the rougher, cleaner flotation tank at a first level within the rougher, cleaner flotation tank which is located above a second level where an electrolysis device is located in the rougher, cleaner flotation tank and above a third level where a gas is sparged into said rougher, cleaner flotation tank;

(11) operating an electrolysis device at the second level of the rougher, cleaner flotation tank to decompose the liquid therein and form a first group of gas bubbles which rise through a substantial part of the depth of the liquid which defines the collection zone of the rougher, cleaner flotation tank;

(12) sparging a gas into the rougher, cleaner flotation tank to produce gas bubbles in the liquid at a level of the rougher, cleaner flotation tank which lies below the first level at which the first stage metal-bearing mineral concentrate from the rougher flotation tank is introduced into the rougher, cleaner flotation tank;

(13) allowing the first stage, metal-bearing mineral concentrate to descend under the influence of gravity to a fourth level located in the bottom of the rougher, cleaner flotation tank such that during said descent the first stage, metal-bearing mineral concentrate is exposed to gas bubbles produced by the electrolysis device and by the sparging gas in order that a first portion of the first stage, metal-bearing mineral concentrate becomes associated with the rising gas bubbles to produce a metal-bearing mineral froth in the cleaning zone of the rougher, cleaner tank while a remainder portion of the first stage, metal-bearing mineral concentrate descends to the fourth level of the rougher, cleaner flotation tank;

(14) collecting the remainder portion of the first stage, metal-bearing mineral bearing mineral concentrate from the bottom of the rougher, cleaner flotation tank;

(15) collecting the mineral-containing froth from the collection zone of the rougher, cleaner flotation tank and concentrating said froth to form a second stage, metal-bearing mineral concentrate and transferring said concentrate to a differential flotation tank;

(16) partially filling a differential flotation tank with a liquid to define a collection zone occupied by said liquid and a cleaning zone located above said liquid which is to be occupied by a froth produced by a flotation process carried out in said differential flotation tank and wherein said liquid is capable of decomposing under electrolysis to form gas bubbles which have average diameters smaller than the average diameters of gas bubbles introduced into said differential flotation tank by sparging;

(17) introducing into the liquid of said differential flotation tank a flotation agent capable of selectively floating a first metal-bearing mineral constituent of the second stage metal-bearing mineral concentrate;

(18) introducing into said liquid of said differential flotation tank a depressant agent capable of selectively depressing a second metal-bearing material constituent of the second stage, metal-bearing mineral concentrate;

(19) operating an electrolysis device at the second level of the rougher, cleaner flotation tank to decompose the liquid in order to form a first group of gas bubbles which rise through a substantial part of the depth of the liquid which defines the collection zone of the differential flotation tank;

(20) introducing the second stage, metal-bearing mineral concentrate into the differential flotation tank at a first level within the differential flotation tank which is located above a second level where an electrolysis device is positioned in said differential flotation tank;

(21) sparging gas bubbles into the differential flotation, tank at a third level which lies below the first level at which the second stage, metal-bearing mineral concentrate is introduced into the differential flotation tank;

(22) allowing the second stage, metal-bearing mineral concentrate to descend under the influence of gravity to a fourth level located in the bottom of the differential flotation tank such that during said descent a first metal-bearing mineral constituent of the second stage, metal-bearing mineral concentrate becomes associated with the flotation agent and is exposed to the gas bubbles in order that a first metal bearing mineral constituent becomes associated with the rising gas bubbles and thereby producing a third metal-bearing mineral froth in the cleaning zone of the differential flotation tank while a second metal-bearing mineral constituent of the second stage, metal-bearing mineral concentrate becomes associated with the depressant agent and descends to the fourth level in the differential flotation tank;

(23) collecting the third metal bearing-mineral froth from the collection zone of said differential flotation tank;

(24) collecting the second metal-bearing mineral constituent from the bottom of the differential flotation tank to produce a concentrate of said second metal-bearing mineral constituent; and

(25) smelting the second metal-bearing mineral constituent to obtain a metal contained in said second metal-bearing mineral constituent.

2. The process of claim 1 wherein one of the metal bearing mineral constituents is a copper porphyry mineral.

3. The process of claim 1 wherein one of the metal bearing mineral constituents is a copper porphyry mineral selected from the group consisting of chalcopyrite, covellite, chalcocite, bornite and bournonite.

4. The process of claim 1 wherein one of the metal bearing mineral constituents is a sulfide mineral selected from the group consisting of molybdenite, tentrahedrite-tennantite, polybasite, arsenopyrite, pyrite, pyrrhotite, marcasite, enargite, galena, boulangerite, sphalerite, argentite, pentlandite, tentrahedrite-tennantite, pyrargyrite, stephanite, proustite, millerite, nickeline, cobaltite, glaucodot and skutterudite.

5. The process of claim 1 wherein the liquid in the first tank is also subjected to shear forces produced by an impeller operating below the first level where the ore is introduced into the tank, but above the second level where the electrolysis device is located.

6. The process of claim 1 wherein the liquid in the first tank is also subjected to shear forces produced by an impeller operating below the second level where the electrolysis is located, but above the fourth level in the bottom of the tank where the remainder portion of the ore descends.

7. The process of claim 1 wherein the first level within the first tank at which the ore is introduced is a level which is below the top surface of the liquid.

8. The process of claim 1 wherein the liquid in the first tank is primarily water and hence the gas bubbles produced by electrolysis are primarily those of oxygen and hydrogen.

9. The process of claim 1 wherein the electrolysis of the liquid in the rougher flotation tank is carried out between two, opposing, electrically charged plates which each are constructed in the form of two substantially horizontal screens which span across a substantial portion of a horizontal cross section of the tank wherein said screens each have a mesh size which allows descending ore particles to freely pass through both screens as they descend to the fourth level and wherein said screens are provided with current densities of about 0.025 A/cm$^2$.

10. The process of claim 1 wherein the electrolysis of the liquid in the rougher flotation tank is carried out between two plates which each are constructed in the form of a screen which spans across a substantial portion of a horizontal cross section of the tank at level two and wherein an oxygen producing anode screen of the electrolysis device is made of a first kind of metallic construction material and a hydrogen producing cathode screen of the electrolysis device is made of a second kind of metallic construction material and wherein said screens are provided with current densities of about 0.025 A/cm$^2$.

11. The process of claim 1 wherein the electrolysis of the liquid in the first tank is carried out between two plates which each are constructed in the form of a screen which spans across a substantial portion of a horizontal cross section of the tank and wherein an oxygen producing anode screen of the electrolysis device is made up of wire-like elements of a first metallic construction material having a vertical cross sectional areas greater than a hydrogen producing cathode screen which is made up or wire-like elements of a second metallic construction material having cross sectional areas less than the cross sectional areas of the anode screen and wherein said screens are provided with current densities of about 0.025 A/cm$^2$.

12. The process of claim 1 wherein the electrolysis device at the second level of the first tank is comprised of at least one electrolysis device which is mounted to the inside of the tank such that two, opposing, electrically charged plates of such device have a substantially vertical orientation and wherein said screens are provided with current densities of about 0.025 A/cm$^2$.

13. The process of claim 1 wherein the electrolysis device at the second level of the first tank is comprised of a group of separate electrolysis devices each comprised of two, opposing electrically charged plates which are each mounted around the inside of the tank such that said plates have a substantially vertical orientation and wherein said screens are provided with current densities of about 0.025 A/cm$^2$.

* * * * *